United States Patent [19]

Nazerian et al.

[11] Patent Number: 5,412,856
[45] Date of Patent: * May 9, 1995

[54] WIRE MARKING, CUTTING AND STRIPPING APPARATUS AND METHOD

[75] Inventors: Greg Nazerian, Pasadena; Ronald Bailey, Alta Loma; Jack L. Hoffa, Brea, all of Calif.

[73] Assignee: Eubanks Engineering Company, Monrovia, Calif.

[*] Notice: The portion of the term of this patent subsequent to Sep. 6, 2011 has been disclaimed.

[21] Appl. No.: 225,813

[22] Filed: Apr. 11, 1994

Related U.S. Application Data

[63] Continuation of Ser. No. 22,954, Feb. 25, 1993, which is a continuation-in-part of Ser. No. 765,986, Sep. 26, 1991, Pat. No. 5,253,555.

[51] Int. Cl.⁶ ............................................. H02G 1/12
[52] U.S. Cl. .................................. 29/33 M; 29/747; 29/825; 81/9.51
[58] Field of Search .............. 29/33 M, 747, 748, 825; 81/9.51

[56] References Cited

U.S. PATENT DOCUMENTS

| | | |
|---|---|---|
| 1,433,320 | 10/1922 | Wersel . |
| 1,477,678 | 12/1923 | Wetmore . |
| 2,523,936 | 9/1950 | Axelsen . |
| 2,645,959 | 7/1953 | Fuchs et al. . |
| 2,671,363 | 3/1954 | Wells . |
| 2,722,145 | 11/1955 | Schulenburg . |
| 2,765,685 | 10/1956 | Stratman et al. . |
| 2,811,063 | 10/1957 | Eubanks . |
| 2,880,635 | 4/1959 | Harris . |
| 2,934,982 | 5/1960 | Eubanks . |
| 3,176,550 | 4/1965 | Marcotte . |
| 3,222,957 | 12/1965 | Kramer et al. . |
| 3,292,462 | 12/1966 | Turecek et al. . |
| 3,309,948 | 3/1967 | Falken . |
| 3,368,428 | 2/1968 | Gudmestad . |
| 3,376,627 | 4/1968 | Sitz . |
| 3,479,718 | 11/1969 | Van De Kerkhof et al. . |
| 3,552,449 | 1/1971 | Woodward . |
| 3,570,100 | 3/1971 | Kindell et al. . |
| 3,612,111 | 9/1969 | Meyer . |
| 3,614,905 | 3/1969 | Bieganski . |
| 3,645,156 | 2/1972 | Meyer et al. . |
| 3,653,412 | 4/1972 | Gudmestad . |
| 3,701,301 | 10/1972 | Gudmestad . |
| 3,769,681 | 11/1973 | Eubanks . |
| 3,838,612 | 10/1974 | Inami . |
| 3,857,306 | 12/1974 | Gudmestad . |
| 3,857,313 | 12/1974 | Endo . |
| 3,869,781 | 3/1975 | Eubanks et al. . |
| 3,872,584 | 3/1975 | Chick et al. . |
| 3,881,374 | 5/1975 | Gudmestad . |

(List continued on next page.)

FOREIGN PATENT DOCUMENTS

| | | |
|---|---|---|
| 2525403 | 7/1984 | France . |
| 2513478 | 2/1985 | France . |
| 1084799 | 7/1960 | Germany . |
| 2927235 | 8/1980 | Germany . |

(List continued on next page.)

OTHER PUBLICATIONS

Standard Logic Catalogue, "EWS-6K Electronic Wire Stripper", Feb. 1974.
Artos Catalog Sheet, "Single Blade, Fully-Automatic Wire Processing", 1989.
Komax 33 Catalogue Sheet, 1988.

*Primary Examiner*—James G. Smith
*Attorney, Agent, or Firm*—William W. Haefliger

[57] ABSTRACT

A system for marking elongated wire and for cutting the wire and stripping insulation therefrom comprising first structure operable to mark the wire; second structure operable to cut the marked wire and to strip insulation from the wire; the wire extending between and movable between the first and second structures, the first and second structure comprising separate stand-alone devices; and control structure, including external computer means, operatively connected with the first and second structures for controlling operation of the first and second structures in time sequence relation to wire movement therebetween, and/or to control wire marking, wire cutting, and insulating stripping length.

35 Claims, 18 Drawing Sheets

U.S. PATENT DOCUMENTS

| | | |
|---|---|---|
| 3,918,330 | 11/1975 | Blaha . |
| 3,921,472 | 11/1975 | Gudmestad et al. . |
| 3,927,590 | 12/1975 | Gudmestad et al. . |
| 4,009,738 | 3/1977 | Baba et al. . |
| 4,027,557 | 6/1977 | Stepan . |
| 4,091,695 | 5/1978 | Funcik et al. . |
| 4,112,791 | 9/1978 | Wiener . |
| 4,156,961 | 6/1979 | Agoh . |
| 4,164,808 | 8/1979 | Gudmestad et al. . |
| 4,165,768 | 8/1979 | Gudmestad . |
| 4,166,315 | 9/1979 | Gudmestad et al. . |
| 4,175,316 | 11/1979 | Gudmestad . |
| 4,194,281 | 3/1980 | Gudmestad . |
| 4,238,981 | 12/1980 | Karl . |
| 4,244,101 | 1/1981 | Talley . |
| 4,261,230 | 4/1981 | Sindelar . |
| 4,266,455 | 5/1981 | Ago . |
| 4,275,619 | 6/1981 | Shimizu . |
| 4,327,609 | 5/1982 | Resch . |
| 4,350,061 | 9/1982 | Isham et al. . |
| 4,364,289 | 12/1982 | Sorensen . |
| 4,370,786 | 2/1983 | Butler . |
| 4,403,383 | 9/1983 | Dewhurst et al. . |
| 4,428,114 | 1/1984 | Teagno . |
| 4,446,615 | 5/1984 | Talley . |
| 4,485,735 | 12/1984 | Jonca . |
| 4,493,233 | 1/1985 | Dusel et al. . |
| 4,502,586 | 3/1985 | Dusel et al. . |
| 4,521,946 | 6/1985 | Dusel et al. . |
| 4,543,717 | 10/1985 | Luka . |
| 4,581,796 | 4/1986 | Fukuda et al. . |
| 4,584,912 | 4/1986 | Gudmestad et al. . |
| 4,597,179 | 7/1986 | Goforth . |
| 4,601,093 | 7/1986 | Cope . |
| 4,631,822 | 12/1986 | Reinertz . |
| 4,638,558 | 1/1987 | Eaton . |
| 4,713,880 | 12/1987 | Dusel et al. . |
| 4,738,019 | 4/1988 | Kawaguchi . |
| 4,745,828 | 5/1988 | Stepan . |
| 4,802,512 | 2/1989 | Kodera . |
| 4,827,592 | 5/1989 | Kodera . |
| 4,833,778 | 5/1989 | Loustau . |
| 4,838,129 | 6/1989 | Cope . |
| 4,869,135 | 9/1989 | Hoffa . |
| 4,932,110 | 6/1990 | Tanaka . |
| 4,942,789 | 7/1990 | Hoffa et al. . |
| 5,010,797 | 4/1991 | Stepan . |
| 5,016,347 | 5/1991 | Okazaki et al. . |
| 5,067,379 | 11/1991 | Butler et al. . |
| 5,142,950 | 9/1992 | Takano et al. . |

FOREIGN PATENT DOCUMENTS

| | | |
|---|---|---|
| 3926782 | 12/1990 | Germany . |
| 609834 | 11/1948 | United Kingdom . |
| 1216815 | 7/1986 | U.S.S.R. . |
| 1293779 | 2/1987 | U.S.S.R. . |

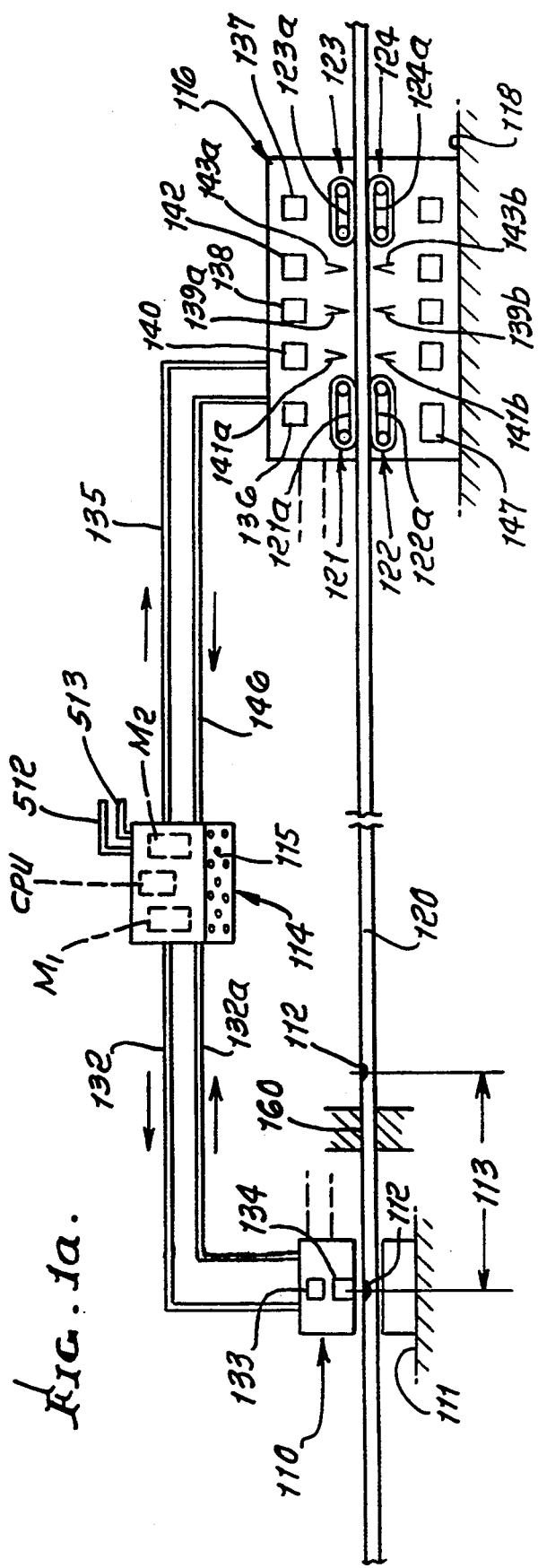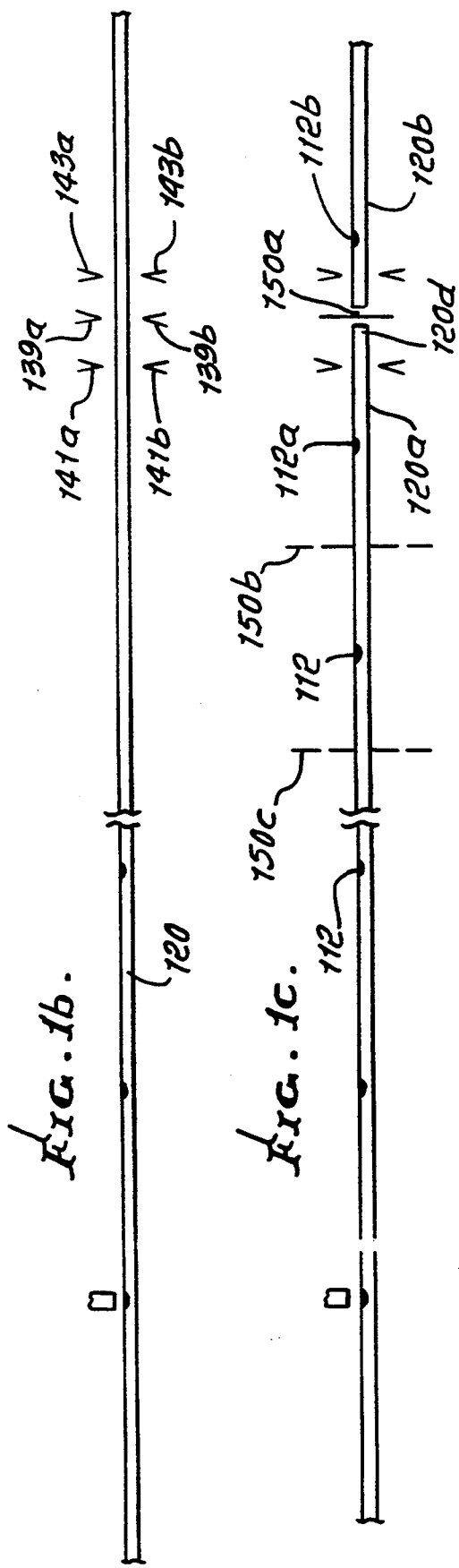

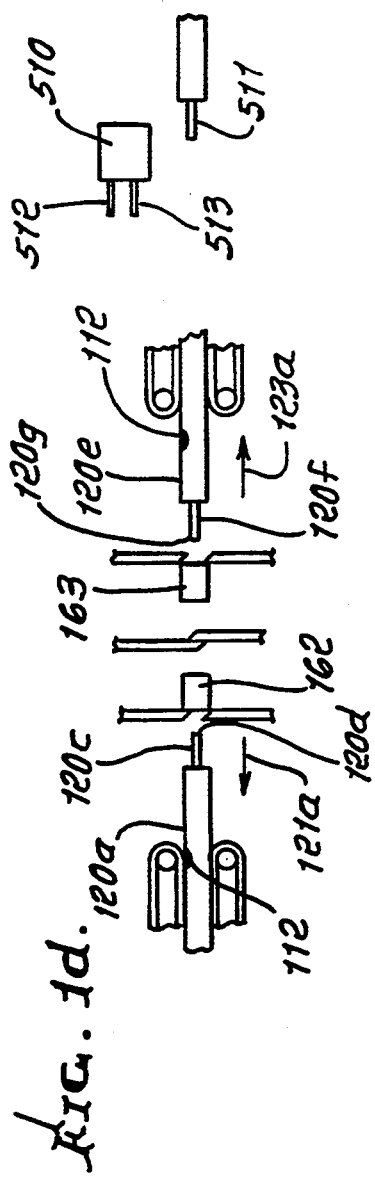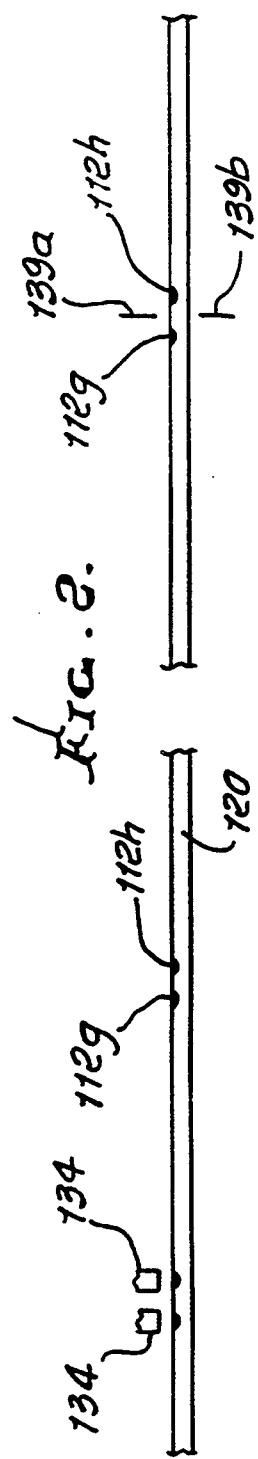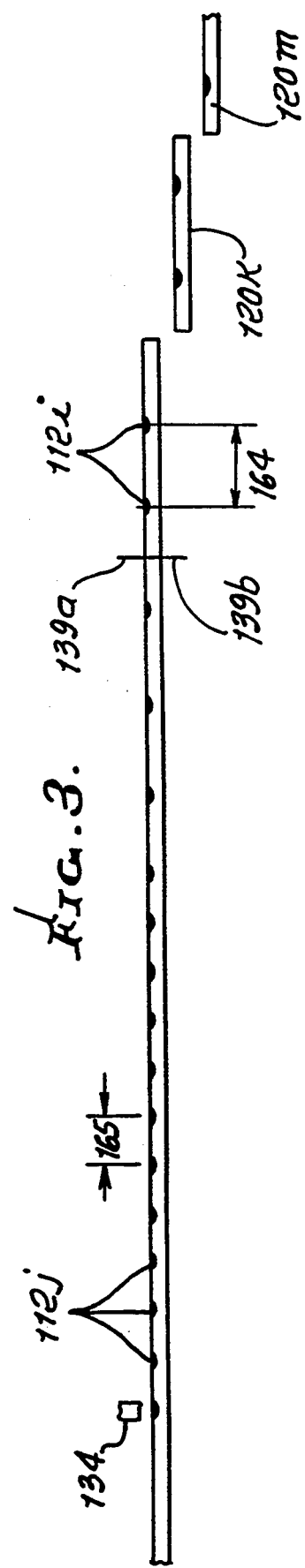

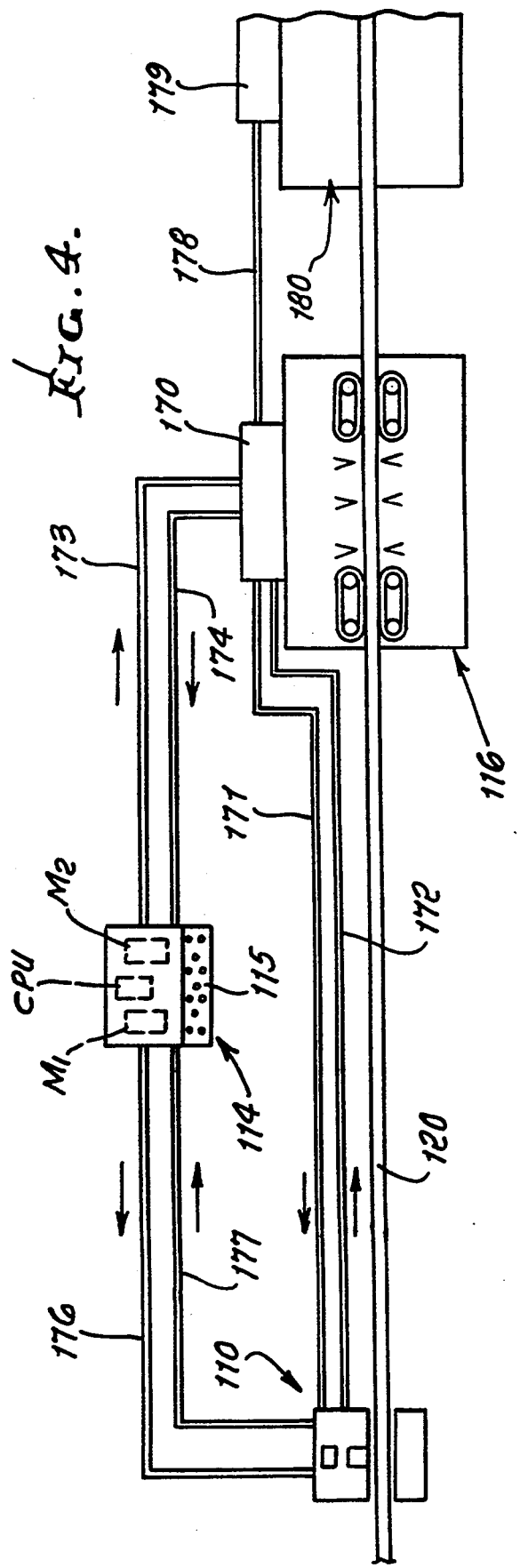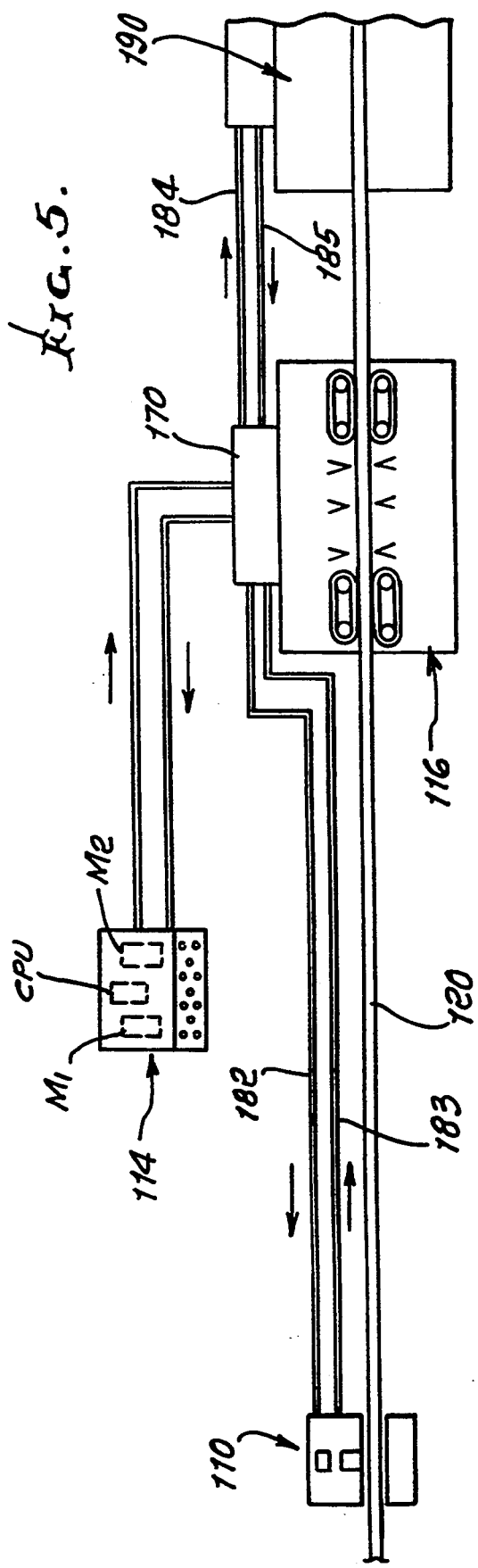

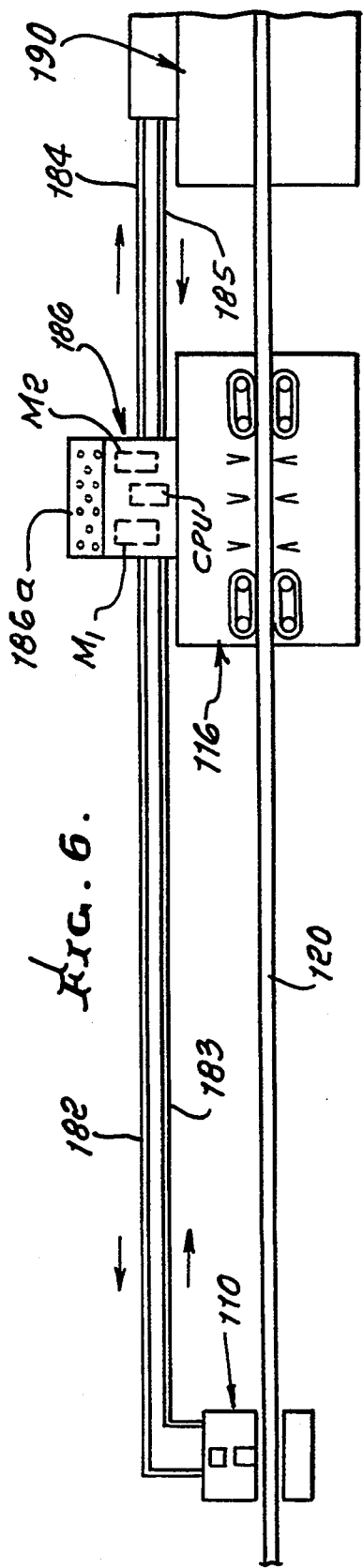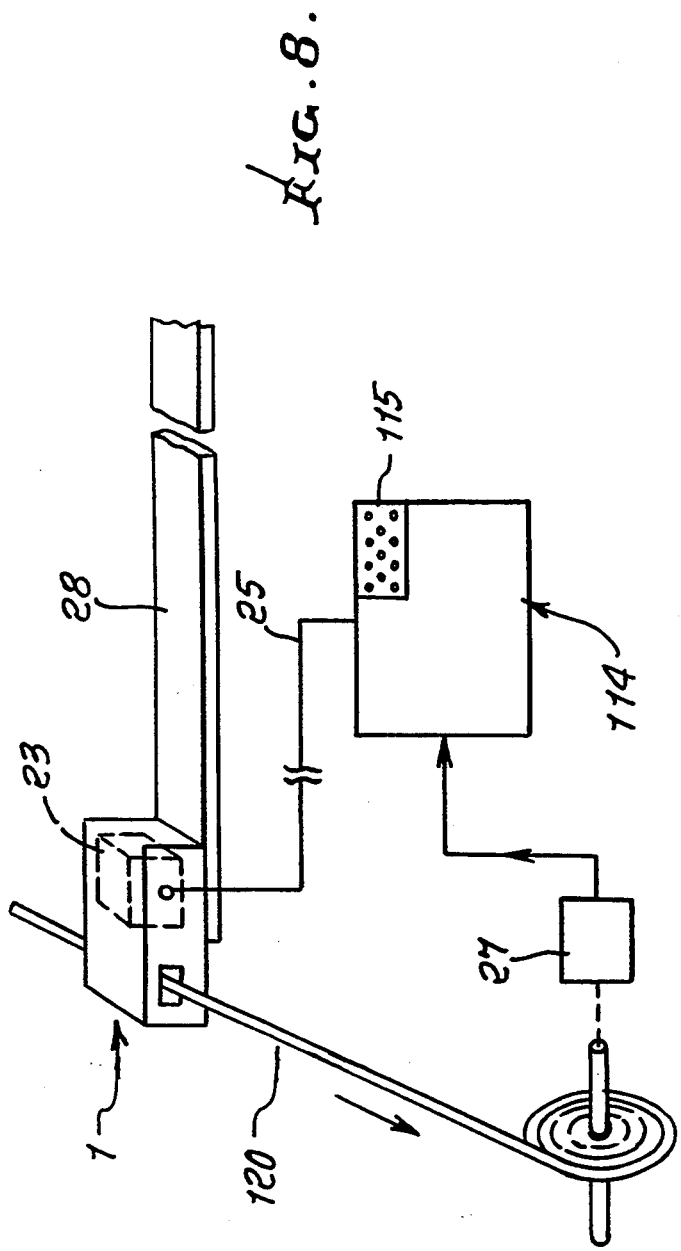

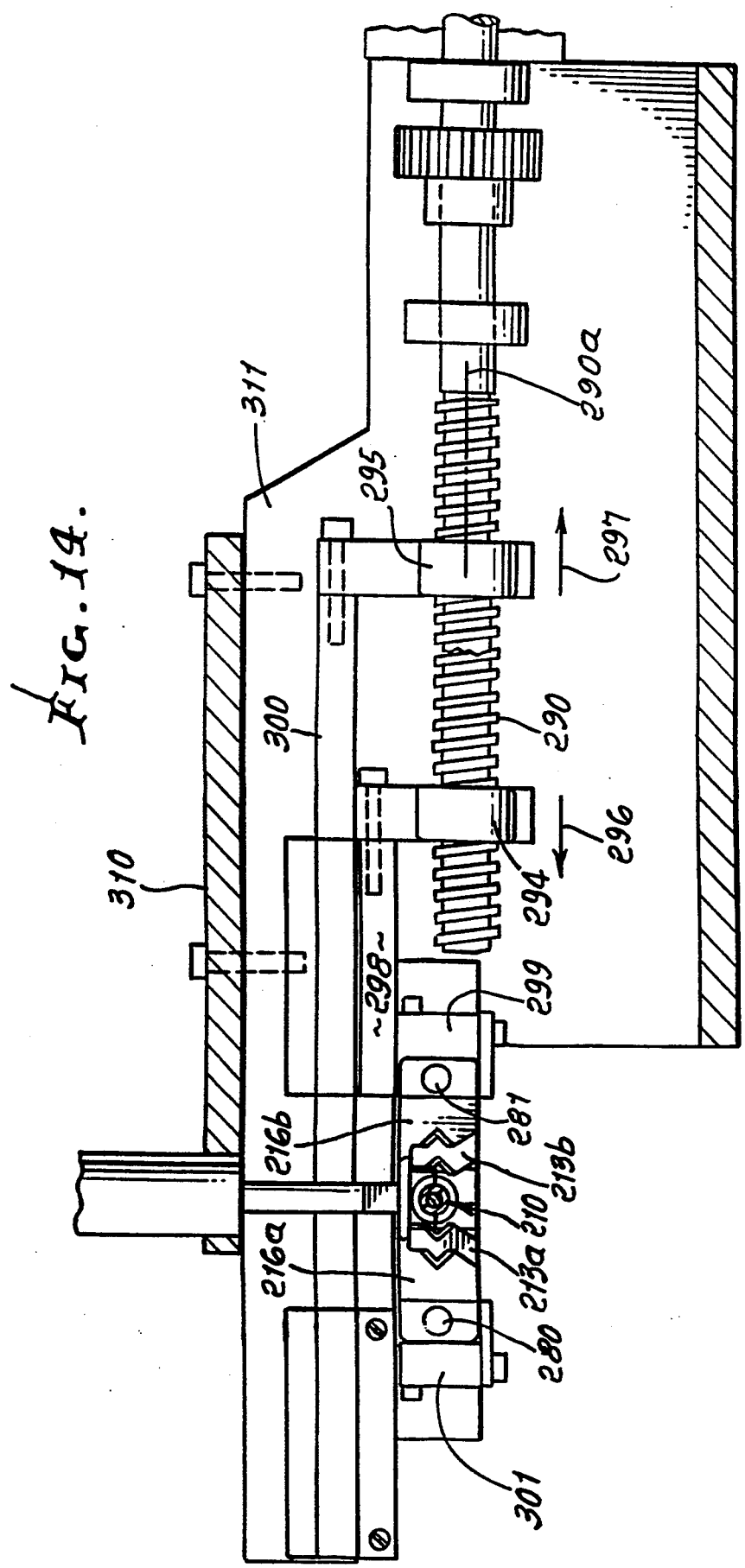

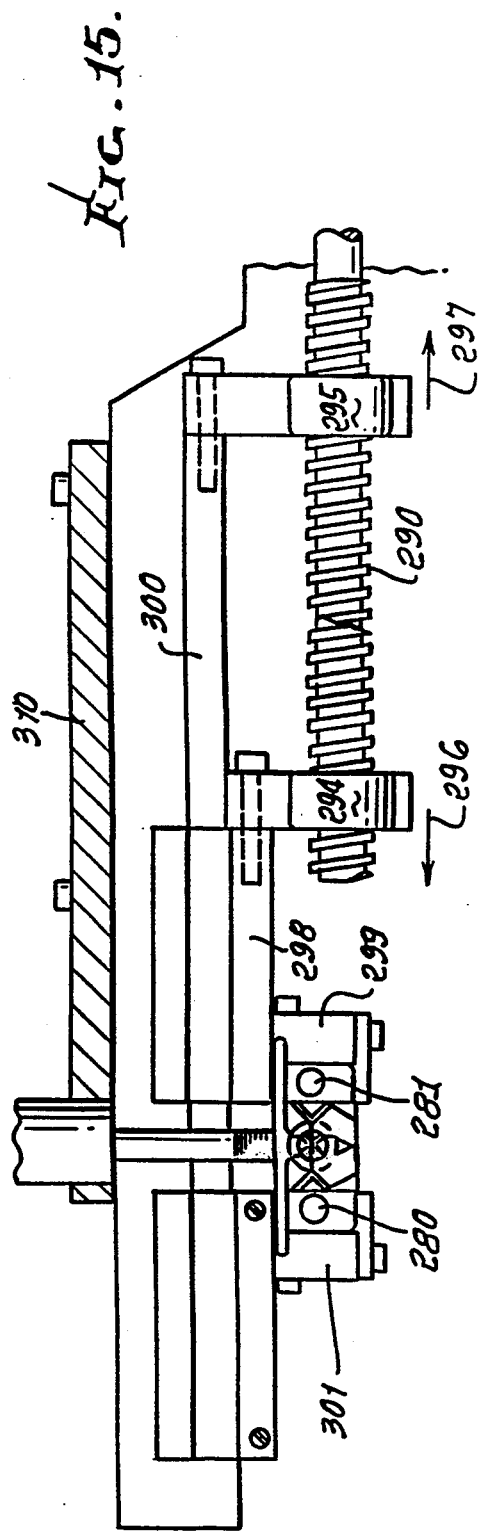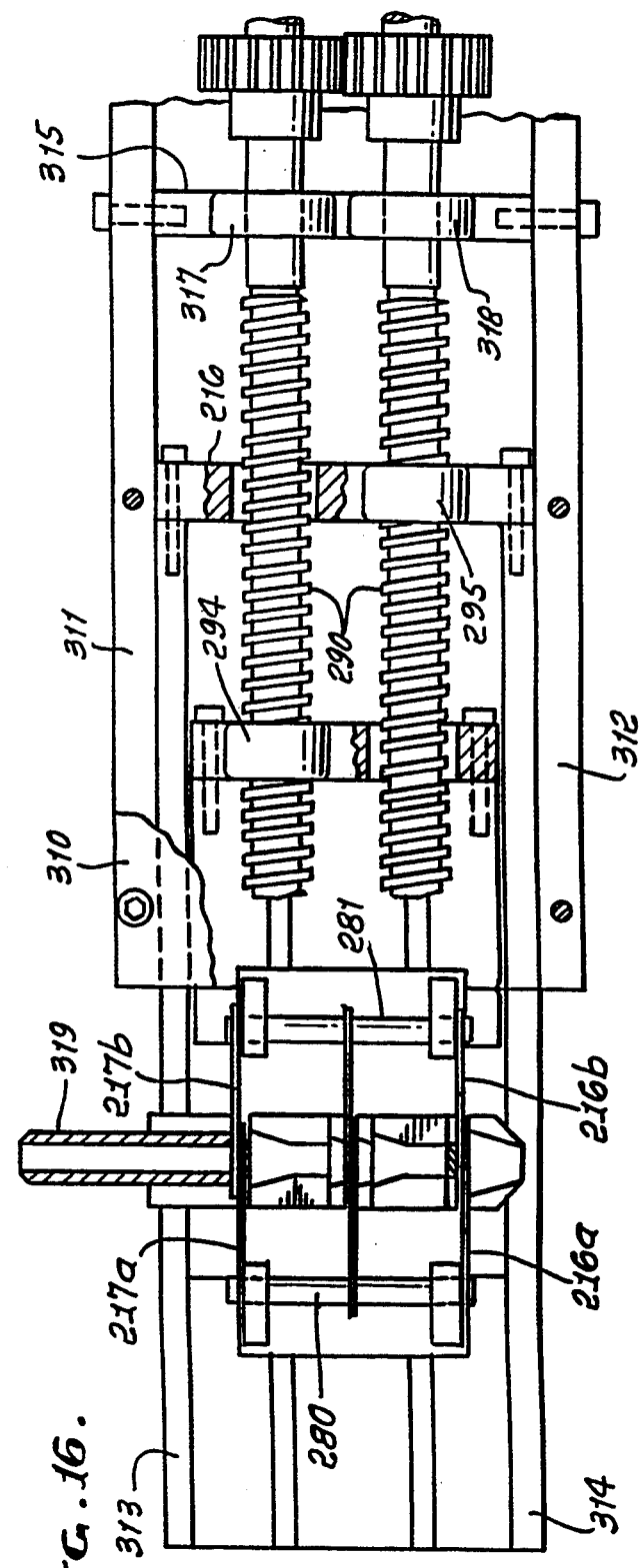

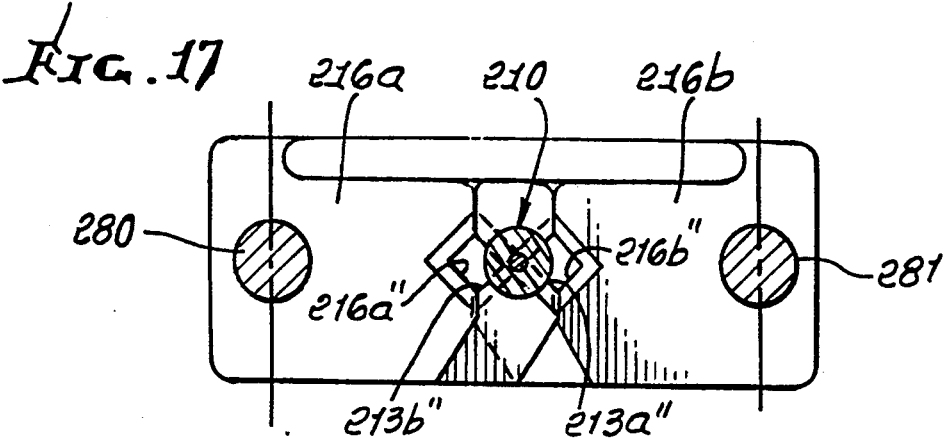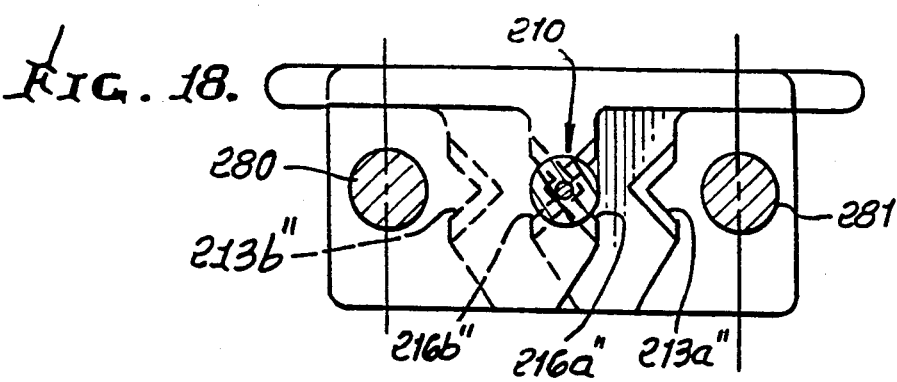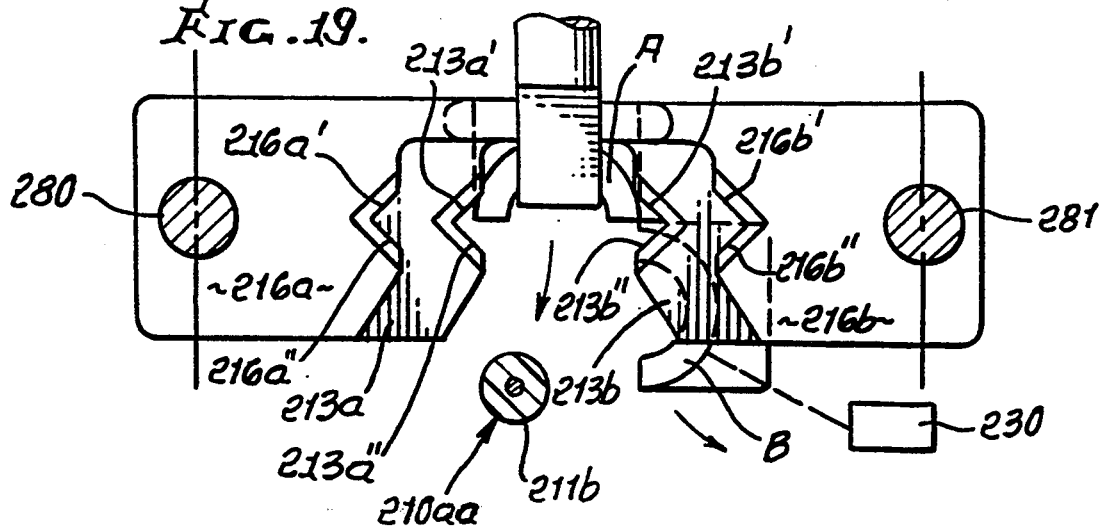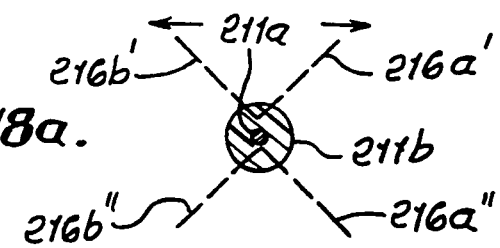

WIRE MARKING, CUTTING AND STRIPPING APPARATUS AND METHOD

This is a continuation of application Ser. No. 08/022,954, filed Feb. 25, 1993.

Which is a continuation-in-part of Ser. No. 765,986, filed Sep. 26, 1991, now U.S. Pat. No. 5,253,555.

This invention relates generally to wire or cable marking and severing, as well as stripping sheathing from severed wire sections; and more particularly, it concerns unusually advantageous method and apparatus to effect marking of a wire or cable at a stand-alone means or apparatus, and severing and/or stripping of the wire or cable at a second stand-alone means or apparatus, while the wire is fed between the first and second means.

There is continual need for equipment capable of sequentially marking and then cutting and/or stripping of wire or cable in relation to the marks placed on the wire or cable. It is desirable that these functions be carried out as a wire or cable travels along generally the same axis, i.e., progresses forwardly, and that multiple appropriately marked wire and cable sections of selected length or different selected lengths be produced, each having one end or its opposite ends stripped of sheathing, to expose bare metal wire core.

SUMMARY OF THE INVENTION

It is a major object of the invention to provide apparatus and method, including programmed control means, meeting the above needs. The word "wire" will be used to include cable within its scope, and vice versa.

In accordance with the invention, system or apparatus is provided as follows:

a) first means operable to mark the wire, b) second means operable to cut the marked wire and to strip insulation from the wire, c) the wire extending between and movable between the first and second means, the first and second means comprising stand-alone devices spaced apart in the direction of wire elongation and travel, d) and control means operatively connected with the first and second means for controlling operation of the first and second means in time sequence relation to wire movement therebetween, and characterized in that changes in timing of markings by operation of the first means can occur while the second means operates to complete cutting and severing of wire associated with prior markings, thereby to reduce or eliminate wire waste, e) the control means including a computer located externally of the first and second means.

As will be seen, the control means may include a programmable computer having memory, processor, and keyboard means, and it may be located apart from or separate from the first and second means, as referred to, the latter being stand-alone devices. The second means may include a microprocessor to control cutting and stripping of the marked wire, the computer connected in controlling relation with the microprocessor. The computer may also be connected with the first (marking) means; or the control of that first means may be controlled by the microprocessor at the second (cutting and stripping) means, in which event the computer controls that microprocessor.

The microprocessor at the second means may itself be programmed so as not to require external computer control.

It is another object of the invention to provide endless belt drives at the second (cutting and stripping) apparatus for driving the wire between the first and second means, continously or interruptedly, and to accommodate marking, cutting and stripping, as referred to.

Yet another object is to provide control means that includes programmable circuitry or software to store command information to produce successive spaced markings on the wire at times $t_1$ and $t_2$ by the first means, and to store command information to produce delayed cutting of the wire by the second means and between the spaced markings, at time $t_3$, where $t_3$ is after $t_1$ and $t_2$, and the control means including circuitry to control driving of the wire at a rate to bring the space between the markings into position for wire cutting at $t_3$. The control means also anticipates and controls changes in markings, while the cutting and severing means completes cutting and severing associated with prior markings, to reduce or eliminate wire waste.

An important feature of this invention is the flexibility that results from the combination of modularity and programmability. The first means (wire marker) and the second means (wire cutter, stripper or terminator) are modular, and the entire system is controlled by one computer that controls various programmable features in both the first means and the second means.

With this system, the user can have a programmable hot stamp wire marker interfaced to a wire cutter, and the user can substitute a wire stripper for the wire cutter to create a programmable hot stamp wire marker-wire stripper system.

The user can also substitute an ink-jet wire marker for the hot stamp wire marker to create an ink jet wire marker-wire cutter system. The user could also substitute a laser wire marker for the hot stamp wire marker, and a wire stripper-terminator for the wire cutter.

These and other objects and advantages of the invention, as well as the details of an illustrative embodiment, will be more fully understood from the following specification and drawings, in which:

DRAWING DESCRIPTION

FIG. 1a is a diagrammatic view of one system for marking elongated wire at one station, and for cutting and/or stripping protective material, such as insulation or other covering, from the wire core, at a second station;

FIG. 1b is a view of the marked wire seen on FIG. 1a, but after it has advanced by an increment toward the second station;

FIG. 1c is a view like FIG. 1b showing the wire advanced toward the second station and being cut at the second station, and in predetermined relation to marks on the wire;

FIG. 1d is an enlarged schematic view of wire cutting and stripping means in operation, at the second station, and in relation to wire markings;

FIG. 2 is a view of dual markings on a wire, and in relation to operation of a cutter;

FIG. 3 is a view of wire markings on one type on a forward portion of a wire, and wire markings of another type on a following rearward portion of the wire;

FIGS. 4–6 are schematic views of alternate control means for wire marking at the first station, and wire cutting and/or stripping at the second station;

FIG. 8 is a perspective view;

FIGS. 9–19 are views showing one form of wire cutting and stripping apparatus, in greater detail, and usable at the second station;

DETAILED DESCRIPTION

Figure 7:
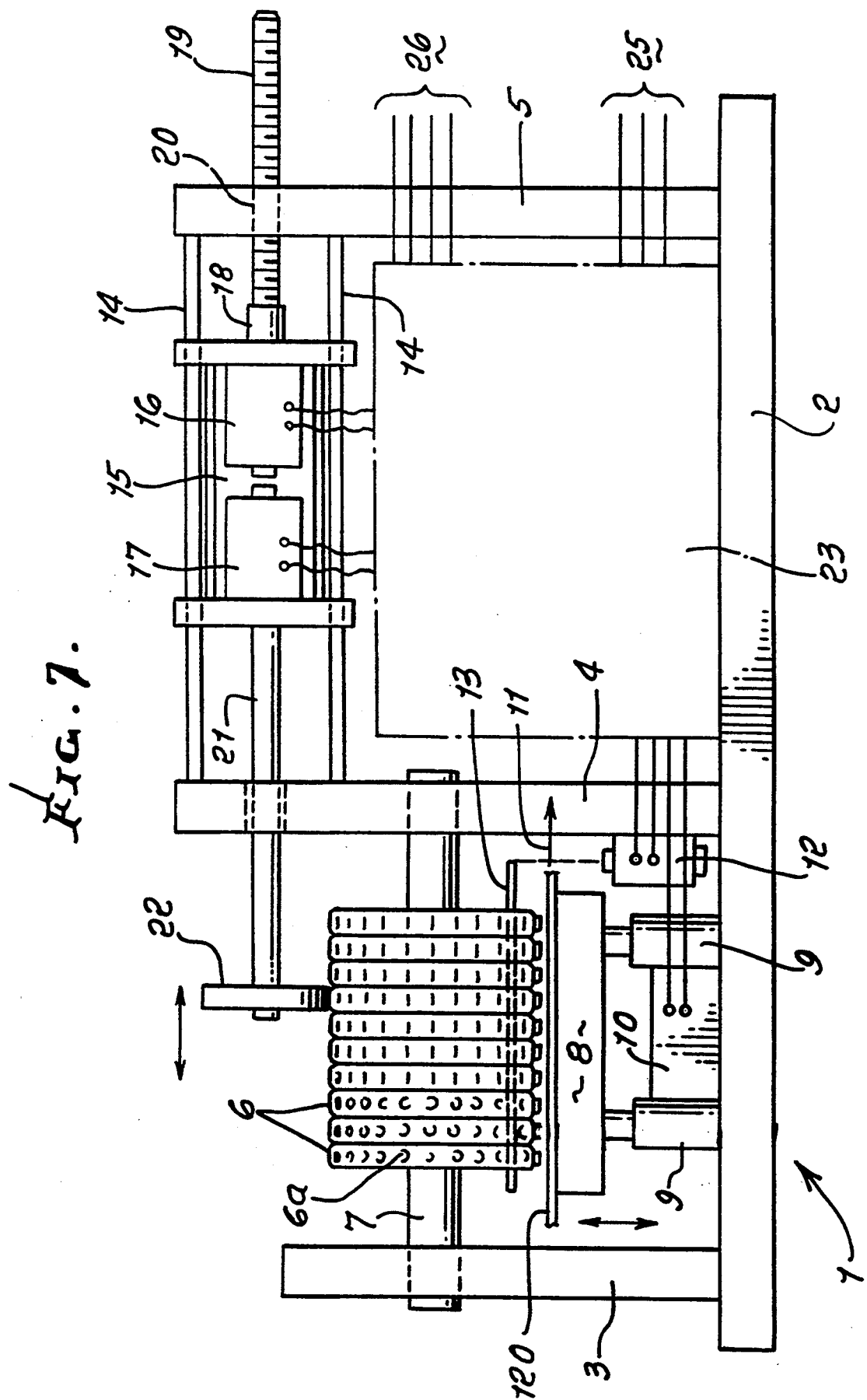
FIG. 7 is an elevation showing one form of wire marking apparatus, in greater detail, and usable at the first station.

Referring first to FIG. 1a, the system shown includes first apparatus or means 110 for marking (printing, etc.) an elongated wire shown at 120, at a stand-alone position, as on a support surface 111. Such apparatus may, for example, take the form shown generally in U.S. Pat. No. 4,485,735 to Jonca. The wire is indicated as traveling rightwardly, and through the apparatus 110, which guides the wire and produces successive, spaced markings 112 on the wire, as for example at intervals 113. The markings and intervals can be controlled or programmed, as by a programmable computer 114, having an associated keyboard 115.

The system also includes second apparatus or means indicated generally at 116, operable to cut the marked wire in relation to the position of the markings on the wire, thereby to produce wire segments, as for example are seen at 120a and 120b in FIG. 1c, in relation to markings on the segments. See identifying markings 112a and 112b on the illustrated segments; and it will be understood that the markings on the segments, their positions on the segments, etc., can be automatically controlled by time-related operation of apparatus 110 and 116. The latter device 116 is also a stand-alone device, so that its distance from device 110 may be varied to suit production requirements in a production facility or plant. A surface to support 116 is indicated at 118.

The wire 120 extends between and is movable between 110 and 116, and is best driven at 116 so as to be pulled through or adjacent to 110. Belt-type conveyors are desirably used to drive the wire in view of their firm (slip free) gripping of the wire along drive lengths, as between stretches 121a and 122a of looping belt conveyors 121 and 122. An additional pair of belt conveyors 123 and 124 is provided for stripping control purposes, as will appear, the wire extending between and engaged by stretches 123a and 124a of 123 and 124. Accordingly, accurate automatic marking of the wire, along its length, and at the first stand-alone station, can be controlled in relation to cutting and stripping of the wire in predetermined relation to the markings, at the second stand-alone station.

Control means is provided to be operatively connected with the means 110 and 116 for controlling their operation, in time sequence relation, to wire movement or travel. In the FIG. 1a example, the control means 114 comprises a programmed computer (see program keyboard 115) for storing electronically or magnetically stored program signals externally of the apparatus at 110 and 116.

A command bus extends at 132 from 114 to the apparatus 110 to command operation of the up and down driver 133 for wire marker 134; and status bus 132a extends from 110 back to 114. Similarly, a command bus extends at 135 from 114 to the apparatus 116 to control:

drive 136 for the conveyors 121 and 122;

drive 137 (if used) for the conveyors 123 and 124 (if used);

drive 138 for closing and opening the cutting blades 139a and 139b;

drive 140 for displacing the stripping blades 141a and 141b to controlled (programmed) depth into the insulation 120a on core 120c, associated with the end 120d of the cut wire;

drive 142 for displacing the stripper blades 143a and 143b to controlled depth into the insulation 120e on the core 120f associated with the wire end 120g of the cut wire (see FIG. 1d).

Return bus 146 extends from 116 back to 114, to provide status signals. An encoder may be provided at 147 and connected to the drive 136 to transmit wire position signals to the computer 114. (Two encoders can be provided, one for each drive.) Since drive 136 and conveyors 121 and 122 control pull of the wire through 110, and since the distance from 110 and 116 is known, the computer can accurately control marking of the wire at known locations thereon. A frictional resistance to wire pull can be provided at 100 to block any return movement of wire back to location of wire at 110.

FIGS. 1b and 1c show the wire at rightward traveling positions at times later than the wire position in FIG. 1a; the wire being cut at 150a in FIG. 1c, with accuracy between two markings 112a and 112b, which then appear on different wire sections. Subsequent (to be) cut positions on the wire are seen at 150b, 150c, etc., between markings 112. Upon reprogramming via the computer and its keyboard, the markings 112 can be made closer together or further apart along the wire, and the timing of cutting controlled in relation to the marking intervals, to cut at some selected distance from the markings.

Accordingly, the first apparatus 110 is positioned at a location from which the wire is driven toward the second apparatus 116, and the control means includes circuitry or software to store command information to produce successive spaced markings on the wire at times $t_1$ and $t_2$ by the first means, and to store command information to produce delayed cutting of the wire by the second means and between the spaced markings, at time $t_3$, where $t_3$ is after $t_1$ and $t_2$. Also, the control means includes circuitry or software to control driving of the wire at a rate to bring the space between successive markings into selected position relative to the cutter and stripper blades, for wire cutting time $t_3$, and for stripping at a time $t_4$ or times $t_4$ (for operation of stripper blades 141a and 141b), and at a time $t_5$ (for operation of stripper blades 143a and 143b). Times $t_4$ and $t_5$ may be coincident.

FIG. 1d shows the two wire sections 120a and 120e relatively separated by the conveyors 121 and 122, and by the conveyors 123 and 124. See arrows 121a and 123a. The stripper blades are shown pulling insulation slugs 162 and 163 off the wire section cores 120c and 120f. Note the markers 112 on the wire sections as related to the exposed cores. Subsequently, the pairs of cutter and stripper blades are moved apart, and conveyors 121 and 122, and 123 and 124, operated to move the forward and rearward wire sections forwardly, for wire travel, as described for FIGS. 1b and 1c.

FIG. 2 shows a wire 120 with pairs of markings 112g and 112h placed on the wire, as a variation.

FIG. 3 shows a changeover from markings 112i at spaced intervals 164, to markings 112j at intervals 165. The computer is programmed to cause cutting at one rate, related to intervals 164 until wire extent with markings 12j arrives at 116, and thereafter cutting changes to another and faster rate, related to intervals 165. Note that during the time it takes for the first mark 116j to travel from 110 to 116, the apparatus 116 is cutting wire at the one slower rate associated with intervals 164. Sections of cut and marked wire are seen at 120k and 120m.

FIG. 4 is like FIG. 1a except that a microprocessor is provided at 170 in association with the apparatus 116 to send "mark" commands to 110, via bus 171, status information being returned to 170 via bus 172. The computer 114 is connected at 173 with the microprocessor 170 to control its operation via data transmission, and status information flows back to 114, via bus 174. Also, 114 transmits "set" data via bus 176 to the marker driver at 110 or associated microprocessor, and status data return flows at 177. Microprocessor 170 also controls, at 178, an additional microprocessor 179 for cut and strip device or devices 180.

FIG. 5 is like FIG. 4 except that the computer 114 only controls microprocessor 170, the latter controlling the marker device 110 and any additional device cut and strip 190. See busses 182 and 183, and 184 and 185.

FIG. 6 is like FIG. 5 except that all control is from a microprocessor or computer 186 at 116, the computer being programmable as at 186a.

DETAILED DESCRIPTION OF AN ILLUSTRATIVE MARKER

As seen in FIG. 7 and disclosed in U.S. Pat. No. 4,485,735, a printing unit 1 of the device 110 comprises a chassis that includes a base plate 2 on which are fixed three supports 3, 4 and 5.

Between the supports 3 and 4 are mounted printing wheels 6, having on their peripheries characters 6a. The wheels rotate independently of one another about a common shaft 7, supported on 3 and 4. Wheels 6 correspond to marker 134 in FIG. 1a. Opposite the printing wheels 6 is a printing block 8 on actuators 9 which enable it to move toward said printing wheels and to move away therefrom. The jacks 9 are controlled by an actuator 10, and are supported by the base plate 2.

On the block 8 is a wire 120 which advances in direction 11. A solenoid 12 (or pneumatic cylinder piston), integral with 2, 3, 4, 5, is adapted to actuate a locking bar 13, to immobilize the printing wheels 6 during the printing operations.

Between supports 4 and 5 are provided guide rails 14 on which a carriage 15 may slide in both right and left directions. The rails 14 are parallel to each other and to the shaft 7. Carriage 15 supports two stepper motors 16 and 17 mounted in line, parallel to the rails 14 and to shaft 7. The shaft 18 of the motor 16 is extended by a threaded part 19 engaged in the corresponding thread of a threaded bore 20 in support. The shaft 21 of motor 17 passes freely through 4 and is provided at its free end with a control wheel 22 which rotates therewith. The plane of the control wheel 22 is parallel to the plane of rotation of the printing wheels 6; and the control wheel 22 may be selectively brought into contact with each of said printing wheels.

The actuator 10, for controlling the jacks 9, the solenoid 12, for controlling the locking bar 13, and the motors 16 and 17, are controlled by a device 23 (corresponds to 133 in FIG. 1a) which interfaces with a computer as at 114 (cf. also FIG. 8 in which the printing unit 1 is shown traversed by wire 120), unit 1 being linked at 25 to 114. Link 25 corresponds to 132 and 132a in FIG. 1a.

When it is desired to compose a marking code with the aid of the printing wheels 6, the computer 114 addresses the following orders to unit 1, via link 25:

deactivation (or activation) of the solenoid 12 by the device 23, so that the locking bar 13 releases the printing wheels 6 and that they can rotate;

activation of the stepper motor 16 (open or closed loop, or closed loop servomotor) by the device 23 so that it rotates its shaft 18 and in consequence of the threaded connection 19–20, the whole of the carriage 15 may slide along the rails 14, so that the control wheel 22 can be successively brought into contact with each of the printing wheels 6, for example starting with one of the end wheels. Activation of the stepper motor is discontinuous, stopping only upon travel of the control wheel 22 from one printing wheel 6 to the following, so that the control wheel 22 remains in contact with each of said printing wheels 6 for a sufficient period of stoppage to bring the desired character 6a of said wheel into print position, i.e., opposite the printing block 3;

activation of the stepper motor 17 by the device 23 during such periods of stoppage of the motor 16, so that, due to the connection (friction, engagement) between the control wheel 22 and the corresponding printing wheel 6, the desired type 6a is brought into wire print position;

activation (or deactivation) of the solenoid 12 by the device 23 in order, after adjustment of all the printing wheels 6, to lock them in position for printing;

activation of the stepper motor 16 by the device 23 to return the carriage 15 to its initial position.

The marking code (for the wire) thus being composed and the wire moving over the printing block 8, each time that it is desired to mark the wire 120, a command is sent to the device 23, either directly, or via the computer 114 and link 25, to cause device 23 to actuate the jacks 9 through the actuator 10, so that the printing block 8 presses the wire 120 against one or more of the characters 6a of the printing wheels 6, in print position.

For example, the computer 114 receives from an encoder 27 information as to the position of advance of the wire 120 and computer control time intervals to cause code markings on the wire spaced apart by any desired length. It will further be noted that, between successive prints or markings on the wire 120, the printing unit 1 may modify the printed code totally, or partly.

For the passage from one code to the other to be as short as possible, the computer 114 is preferably programmed so that the adjustment of each printing wheel 6 by the stepper motor 17 and the control wheel 22 is effected in the manner further illustrated and disclosed in U.S. Pat. No. 4,485,735.

Other type computer or microprocessor-controlled marking or printing devices may be employed.

As seen in FIGS. 9–17, and described in U.S. patent application Ser. No. 765,986, FIGS. 9a–9f show in diagrammatic form the positions of both wire severing and sheathing stripping blades, during various steps in the computer or microprocessor-controlled wire processing procedure or method. In this regard, the "wire" 120 (meant to also refer to cable) has a metal core and a tubular sheathing about the core. The wire is shown extending axially longitudinally in FIGS. 9a–9f, the axis being located at 212. Wire 120 is also referred to as wire 210 in the subsequent description.

First cutter means is provided to include, or may be considered to include, multiple blades. See for example the two wire-cutting blades 213a and 213b of a first set, located or carried for movement laterally toward and away from the wire axis 212. A first, computer-controlled drive for controllably simultaneously enabling or advancing the blades toward one another, laterally oppositely (see arrows 214a and 214b in FIG. 9b), is shown at 215. That drive is also operable to retract the blades 213a and 213b away from one another.

Second and third cutter means are also provided, for sheathing stripping, and each may be considered to include multiple blades located for movement toward and away from the axis 212. See for example the second set of two blades 216a and 216b, and the third set of two blades 217a and 217b.

Blades 216a and 216b are located or considered to be controllably simultaneously displaced, as by computer-controlled drive 218, laterally oppositely, toward one another (see arrows 219a and 219b in FIG. 9d), the drive also operable to retract the blades 216a and 216b away from one another. Similarly, the blades 217a and 217b are located or carried to be controllably displaced, simultaneously, laterally oppositely toward one another (see arrows 220a and 220b in FIG. 9d), and drive 218 may be used for this purpose. Thus, blades 216a and 216b may be displaced toward one another at the same time and to the same extent as blades 217a and 217b are displaced toward another, as is clear from FIG. 9d. The latter shows that the blades 216a and 216b, and 217a and 217b, do not sever the wire but may closely approach the wire while cutting into sheathing 211 for stripping purposes.

Brief reference to FIGS. 17–19 show the blades 216a and 216b to have V-shape, as do wire severing blades 213a and 213b, and blades 217a and 217b. Note edges 216a' and 216a" and 216b' and 216b" (of blades 216a and 216b) cutting into the sheathing in FIG. 18a to approach the wire core from four sides for efficient stripping, while leaving the core uncut. Similar functioning of blade edges 217a' and 217a", and 217b' and 217b" also takes place, as in FIG. 9d.

Figure 9A:
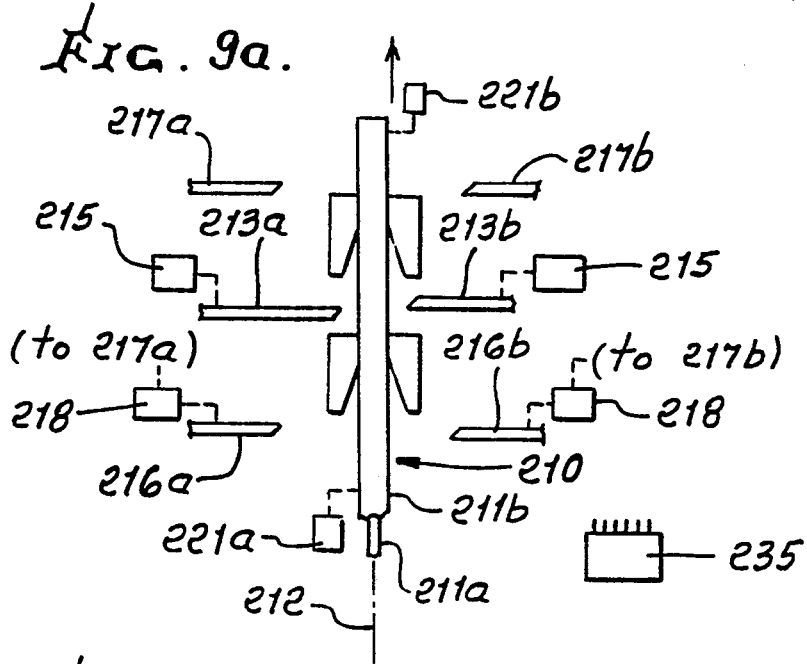
Figure 9B:
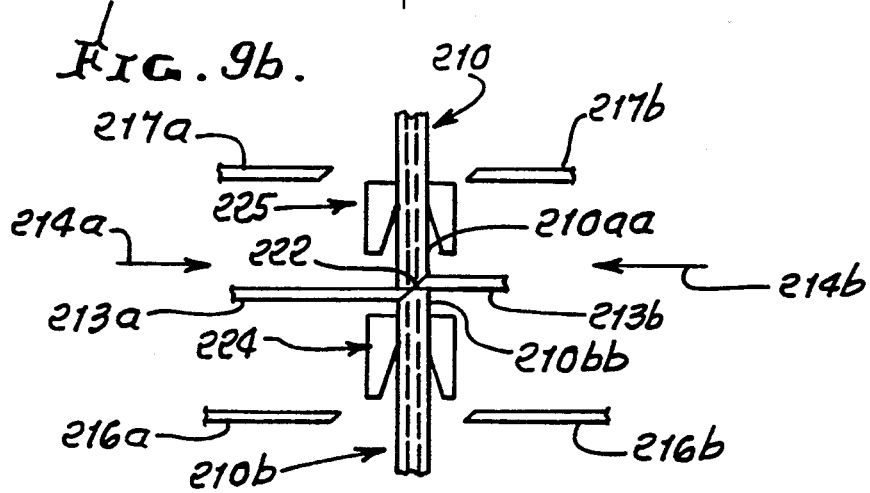

FIG. 9a shows displacement of the wire axially endwise and longitudinally, as by a conveyor means 221a to the first position as shown. FIG. 9b shows the step of severing the wire thereby to form wire forward and rearward sections 210a and 210b, the blades 213a and 213b being advanced laterally to accomplish complete severing at locus 222, as shown. Note that wire forward section 210a has a rearward end portion 210aa; and the wire rearward section 210b has a forward end portion 210bb.

Figure 9C:
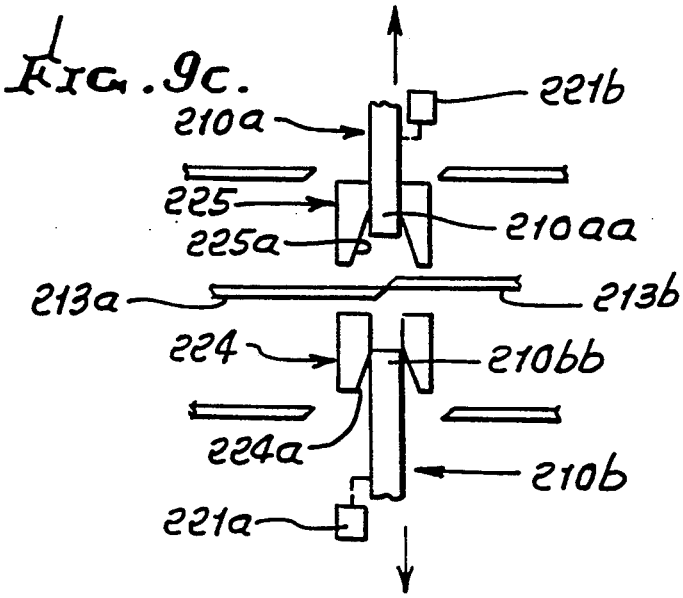

FIG. 9c shows the step of controllably separating the two sections 210a and 210b axially endwise oppositely, as to the positions shown, in which the end portions 210aa and 210bb are spaced from the closed-together blades 213a and 213b. Guides 224 and 225, provided between the blade sets, serve to accurately guide the wire and the sections 210a and 210b during the cutting and severing operation, as is clear from FIGS. 9a–9f.

Note the tapered entrances 224a and 225a to the guides to receive and center the forwardly advanced wire.

Wire drives 221a and 221b are computer or microprocessor-controlled areas operated to engage and separate the two sections 210a and 210b, as indicated in FIGS. 9a and 9c.

Figure 9D:
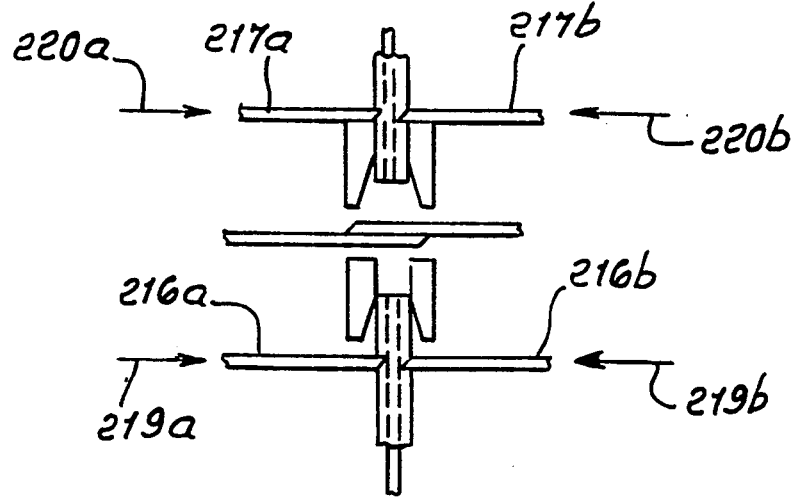

FIG. 9d shows a sub-step included within the step of stripping sheathing from the forward section rearward portion and from the rearward section forward portion thereby to expose wire ends at the portions. Note that blades 216a and 216b are simultaneously advanced laterally oppositely, as to blade edge positions described above as respects FIG. 18a, and as blades 217a and 217b are also simultaneously advanced laterally oppositely (as to the same extent if such stripping is to be equal for each wire section). Note that blades 213a and 213b now extend in laterally overlapping condition due to operation of drives 215 and 218 as one, i.e., equal rightward lateral displacement for blades 213a, 216a and 217a, and equal leftward lateral displacement for blades 213b, 216b and 217b; however, they may be separately driven so as not to extend in such relation, as shown. Blades 213a, 216a and 217a may be connected together to move rightwardly to equal extent; and blades 213b, 216b and 217b may also be connected together to move leftwardly as one, for extreme simplicity.

Figure 9E:
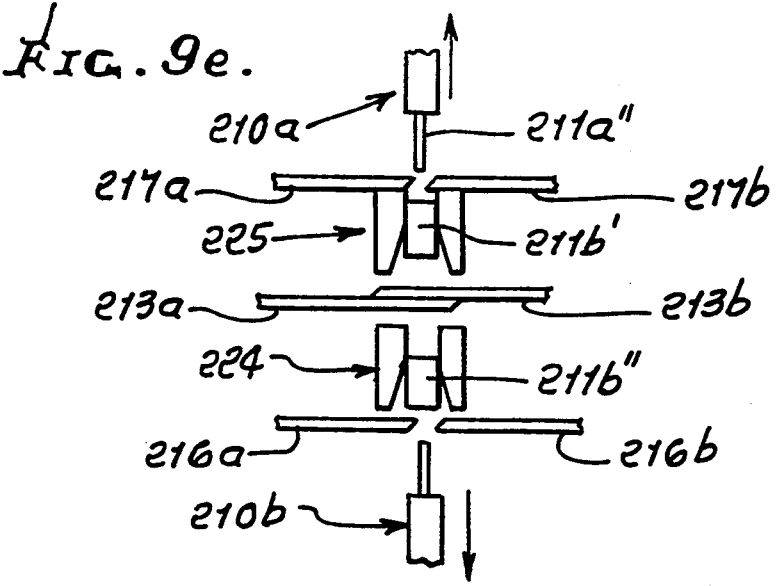

FIG. 9e shows operation of the wire drives to further endwise separate the wire sections 210a and 210b so as to pull or strip two sheathing end portions 211b' and 211b" from the wire sections 210a and 210b, thereby to expose the wire core end portions 211a' and 211a". The stripped sheathing end portions 211b' and 211b", or slugs, are allowed to drop out from between the pairs of guides 224 and 225 which may be split, as shown, to provide slug drop-out openings, and may be movable to facilitate such drop out.

Figure 9F:
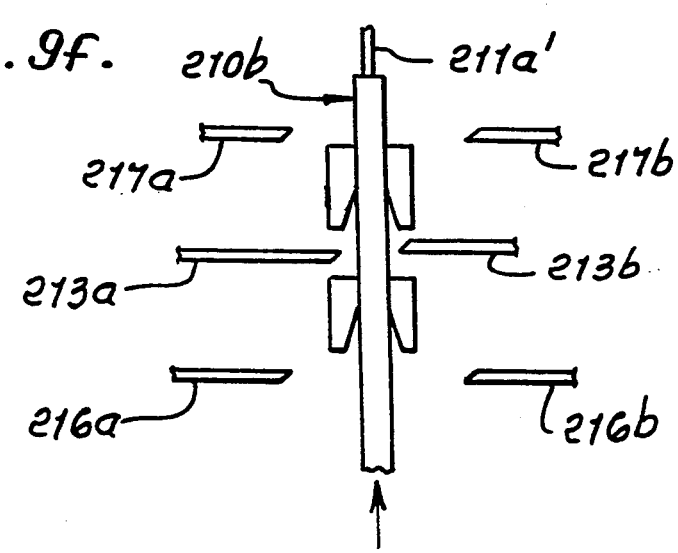

FIG. 9f shows all blades laterally retracted and the wire rearward section 210b fully advanced into position corresponding to FIG. 9a position for controlled length endwise positioning to be processed, as in FIGS. 9b–9e to provide an exposed core end at its opposite end. Thus, controlled length wires (or cables), with exposed core lengths at each end of each wire, is efficiently and rapidly and controllably provided. See master control 235 to control all the driving, as described, and to be described. Control 235 corresponds to a computer 114 and/or microprocessor 170, as discussed above.

Referring now to FIGS. 10–16, one form of apparatus to accomplish the above operations (FIGS. 9a–9f) is shown in detail. A frame is provided, as at 240–244 and 244a, to mount two conveyors 245 and 246, which may be considered as included within the wire drives 230 and 231, as mentioned. Such conveyors may include two rearwardly positioned endless belts 247 and 248, and two forwardly positioned endless belts 249 and 250. The belts provide stretches, as at 247' and 248', which are adapted to sidewise flatly grip the wire 210 (and specifically the wire rearward section 210b) for endwise advancement and retraction, as during separation of the sections 210a and 210b in FIG. 9c; and stretches 249' and 250' are adapted to sidewise grip the wire 210 (and specifically the wire forward section 210a) for endwise advancement and retraction.

Figure 12:
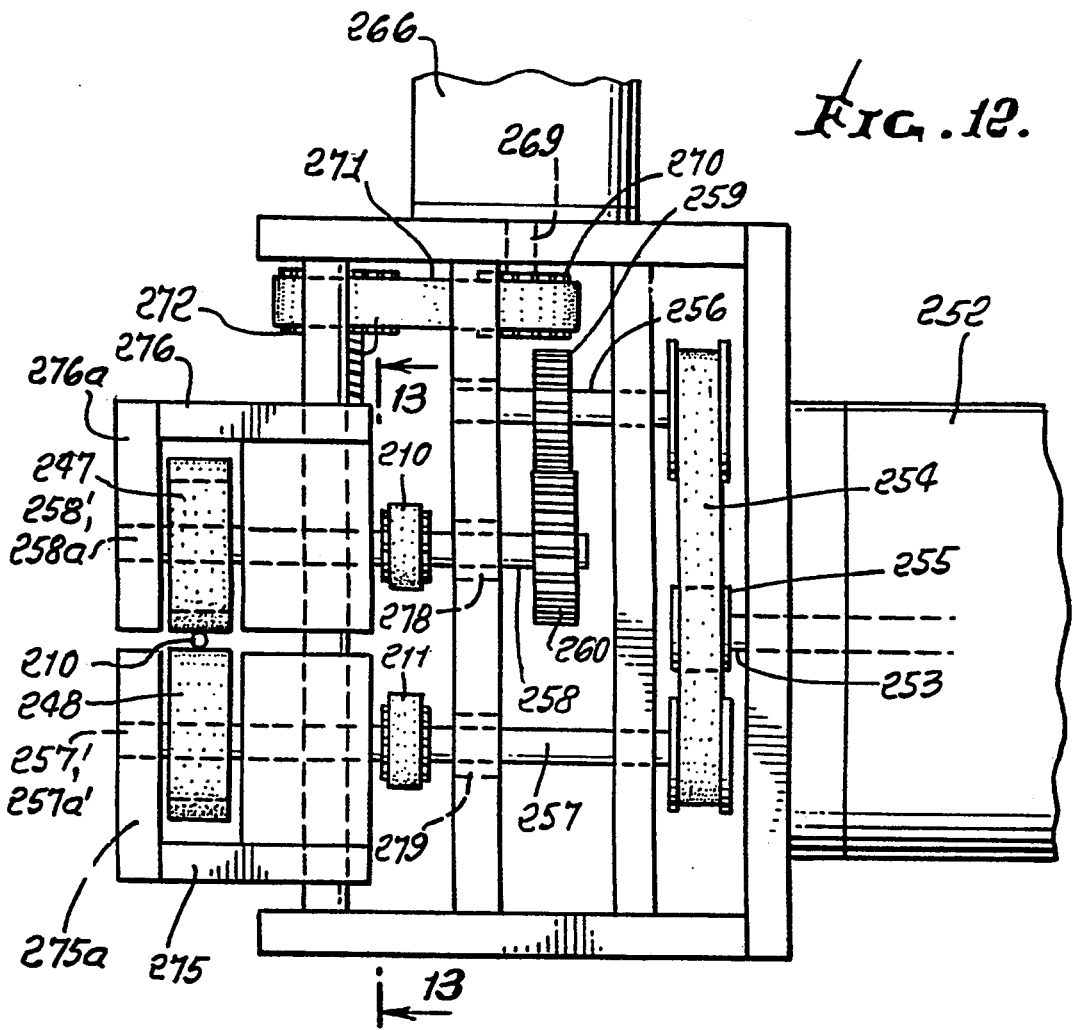

The belts 247 and 248 are driven to advance or retract the wire section 210a as from a drive motor 252 (see FIG. 12). The output shaft 253 of the motor drives belt 254, as via a pulley 255, and belt 254 drives shafts 256 and 257. Shaft 256 drives another shaft 258, through gearing 259 and 260, to drive shaft 258 and upper conveyor belt 247 clockwise; whereas, lower shaft 257 and lower belt 248 are driven counterclockwise in FIG. 10. This drives the wire forwardly; whereas when motor 252 is reversed, the wire is driven rearwardly. Additional axles or shafts for the conveyor belts 247 and 248 appear at 258a and 257a.

Figure 10:
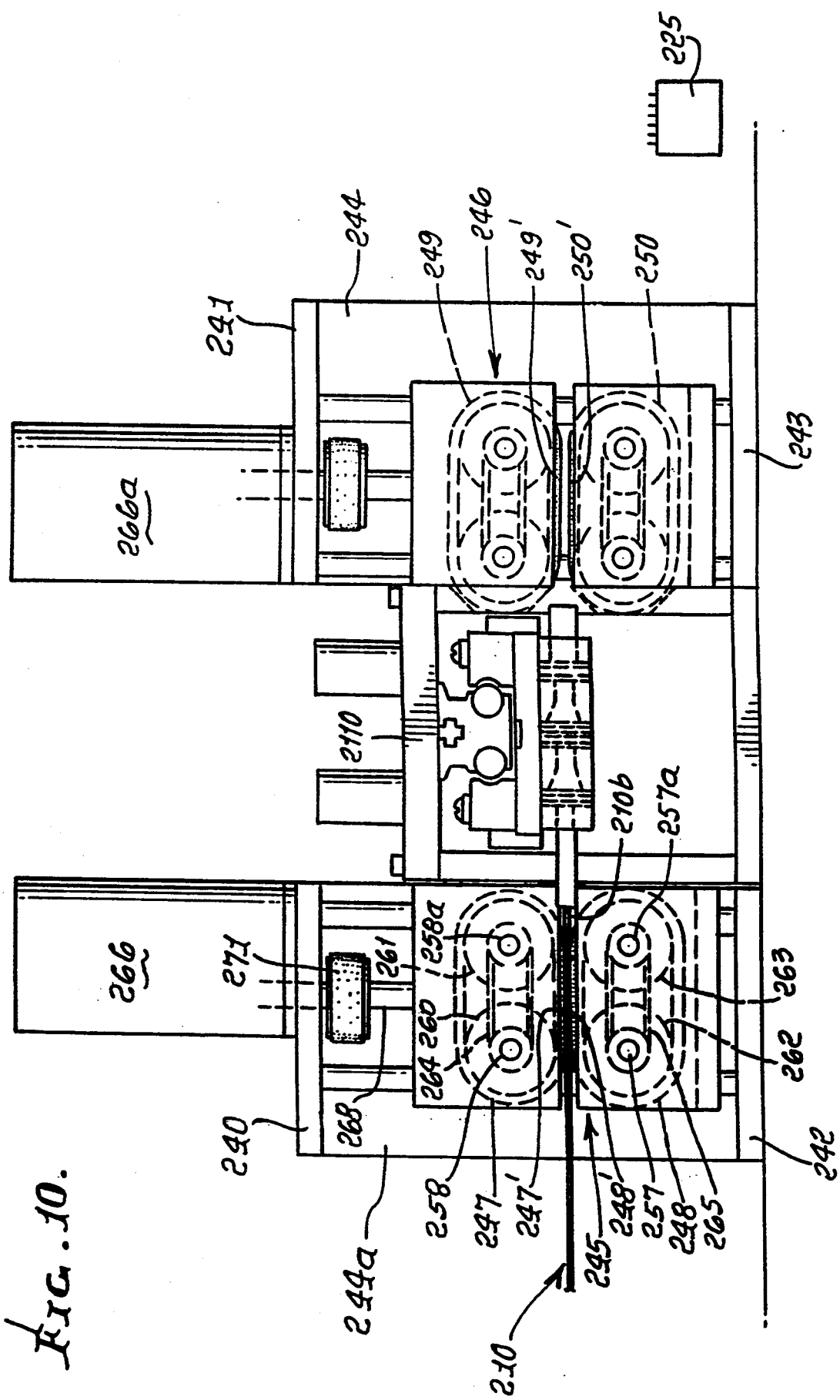

FIG. 10 shows conveyor rotors 260 and 261, and 262 and 263. These carry the belts 247 and 248. Axles 258a and 257a are driven by drive belts 264 and 265 extending between pulleys on the shafts 258 and 258a, and 257 and 257a, as shown. Accordingly, when the belt stretches 247' and 248' are closed against opposite sides of the wire 210, and the motor 252 is operating, the wire is displaced endwise.

Means is provided to move the conveyor belt stretches 247' and 248' toward one another to clutch the wire, and away from one another to de-clutch the wire. See for example in FIGS. 11–13 the computer-controlled motor or drive 266 carried by a frame part 267 to rotate a vertical screw shaft 268, as via motor output shaft 269, pulley 270, belt 271, and pulley 272 on the screw shaft 268. The screw shaft has screw thread engagement at 273 and 274 with frame members 275 and 276. Frame member 276 supports the ends of shafts 258 and 258a, via member extension 276a, as at 258' and 258a'; whereas frame member 275 supports the ends of shafts 257 and 257a, via member extension 275a, as at 257' and 257a'. Screw threading interfit at 274 is oppositely "handed" relative to threading interfit at 273, so that when shaft 68 is rotated in one direction about its axis, the frame members 275 and 276 are displaced toward one another, whereby conveyor stretches 247' and 248' may clamp the wire; and when the shaft 268 is rotated in the opposite direction about its axis, the members 275 and 276 are displaced away from each other, and the wire is de-clutched.

The bearing supports at 278 and 279 for shafts 258 and 257 are made loose enough to accommodate such up/down movement of those shafts at the conveyor belt drive locations. Note also couplings at 210 and 211.

Tension springs 290 and 291 are provided (see FIG. 13) between fixed frame structure 292 and shoulders 276a' on 276a to yieldably urge the structures 276 and 276a, and the belt stretch 247' downwardly; and similarly, tension springs 293 and 294 are provided between fixed frame structure 295 and shoulder 275a' on 275 to yieldably urge the structure 275 and 275a and the belt stretch 248' upwardly. This provides clearance "take-up" for better control of wire gripping or clamping.

Figure 11:
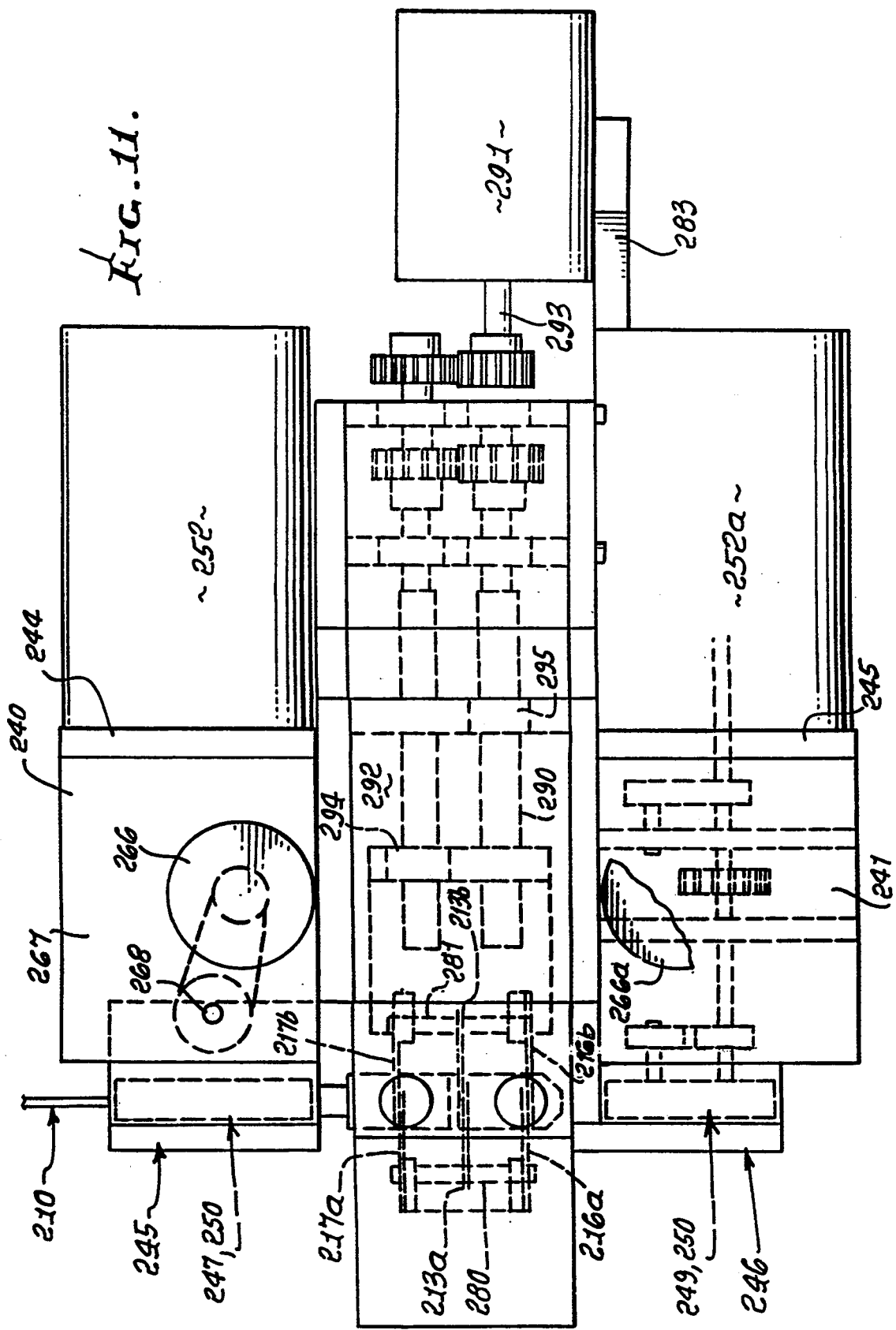
Figure 13:
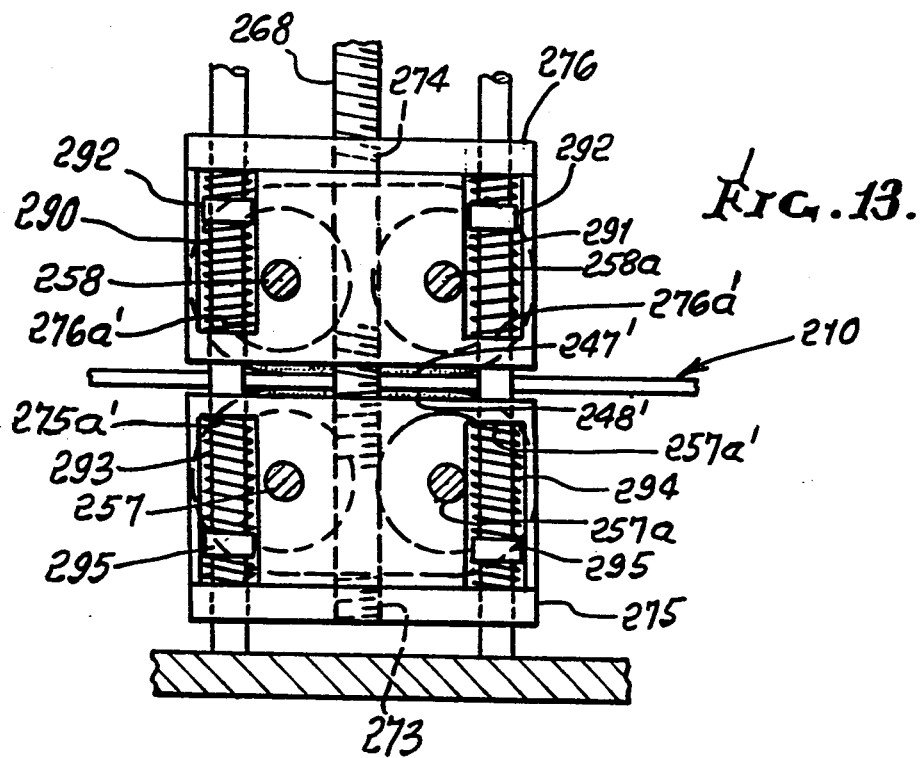

The forward conveyor unit 246 embodies conveyor belt drive and up/down movement the same as described in connection with unit 245 in FIGS. 11–13. The drive motor 252a for driving the belt stretches 249' and 250' forwardly and reversely is seen in FIG. 11, as is the motor 266a to control belt clamping of the forward wire section. Mechanism between the motors 252a and 266a, and the respective forward conveyor belts 249 and 250, is the same as above described mechanism between motors 252 and 266 and the respective rearward conveyor belts 247 and 248; however, the motors 252 and 251a are typically operated simultaneously, either to drive the wire or wire sections forwardly, as in FIGS. 9a and 9f, or to drive the wire sections endwise oppositely, as in FIGS. 9c and 9e. A master control to control all drives, in a pre-programmed manner, is seen at 225, and may correspond to computer 114 and/or microprocessor 170.

Typically, software at 114 generates command signals to control the various drives and actuators at the wire marking apparatus, and wire cutting and severing apparatus discussed, as in FIGS. 9–19.

Referring to FIG. 19, the wire severing blades 213a and 213b are fully laterally retracted, as are the wire sheathing stripping blades 216a and 216b. Blades 217a and 217b are in axial alignment with blades 216a and 216b, and are not shown. Note V-angled blade edges 213a' and 213a'', and blade edges 213b' and 213b''. The blades 213a, 216a and 217a at one side of the wire 210 are interconnected by axially extending carrier rod 280; and the blades 213b, 216b and 217b at the opposite ends of the wire are interconnected by axially extending carrier rod 281, laterally spaced from rod 280. Rods 280 and 281 are relatively movable laterally toward one another to effect wire severing, as by blades 213a and 213b (see also FIG. 9b). Rods 280 and 281 are further laterally movable toward one another to effect penetration of the blade edges 216a' and 216a'', and 216b' and 216b'' into the sheathing (as in FIGS. 18 and 18a), and as also seen in FIG. 9d. Thereafter, the wire forward and rearward sections 210a and 210b are separated as in FIG. 9e to endwise strip the slugs 210aa and 210bb, off the wire cores, as also seen in FIG. 19. Dropping of the slug is also seen in FIG. 19, as is lowering of a wire guide lower sector B of guide 211b'', to release the slug. The upper guide sector is shown at A. A drive 230 is operable to lower and raise sector B.

Means to effect the described lateral movement of the blade carrier rods 80 and 81 in shown in FIGS. 11, and 14–16. As seen, a laterally extending lead screw 290 is rotatable by a drive motor 291, carried by frame part 292. See connecting shaft 293. As screw 290 rotates in one direction about its axis 290a, nuts 294 and 295 on the screw threads travel axially oppositely (see arrows 296 and 297) to move rod 280 to the right and rod 281 to the left, as in FIGS. 17 and 18. See connectors 298 and 299 connecting nut 294 with rod 281, and connectors 300 and 301 connecting nut 295 with rod 280. A pair of parallel lead screws 290 may be utilized for these purposes, as see in FIG. 16, each driven by the motor 291, with one lead screw associated with blades 216a and 216b, and the other associated with blades 217a and 217b. Balanced force transmission to the two sets of blades is thereby effected. See also frame elements 310–316 supporting the structure, as indicated. Bearings appear at 317 and 318. An additional tubular wire guide is seen at 319.

Referring back to FIG. 1a, the programmable computer 114 may be seen to include memory $M_1$ associated with programmed data storage for controlling operation of the marker means 110; memory $M_2$ associated with programmed data storage for controlling operation of the mechanism 116 for cutting wire and for stripping insulation therefrom, including control of stripped insulation length via control of conveyor drives 136 and 137; and central processing unit, CPU. Programmed input is via keyboard 115. Accordingly, programmable means is provided, including memory means to store data associated with at least two programs, for controlling a first (marker) means, and a second means for cutting the wire and for severing insulation at selected strip slug lengths to be removed from the wire. Two or more programs may be stored for accomplishing such functions. Also, means may be provided, as at 510, for applying or attaching a terminal or terminals onto wire cut ends 511 produced by operation of the second means 116. Such "terminating" means 510 is also controlled, as shown by the first means 114, as via data command bus 512 and return bus 513 providing status signals, in a manner similar to control of 110.

From what has been said or described above, the control means, as at 114 for example, includes control means controlling the time sequence of operation of the first and second means 110 and 116 so that no wire is wasted in changing from one marking and cutting (and stripping) program to another; also, the control means 114 includes programmable means, including means to store data associated with at least two programs for controlling the first and second means 110 and 116, to control operation of the second means 116 to in turn control insulation strip length, to control operation of the first means 110 to in turn control the distance between the marks placed on the wire and to produce at least two different programmed distances between marks on a single wire, and to control operation of the first means 110 to control the selection of different characters (marks) to be marked on the wire.

Figure 23:
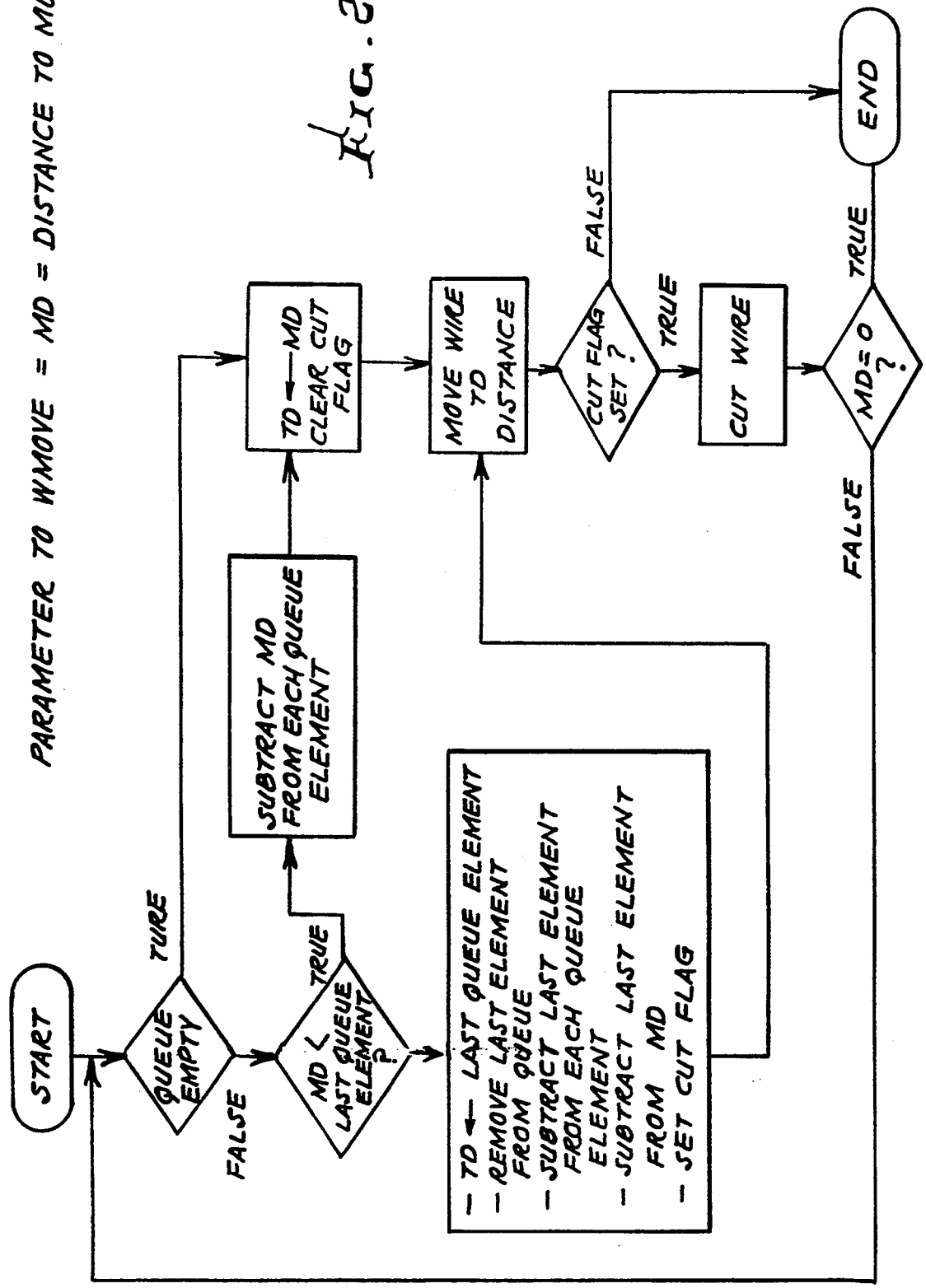
Figure 24:
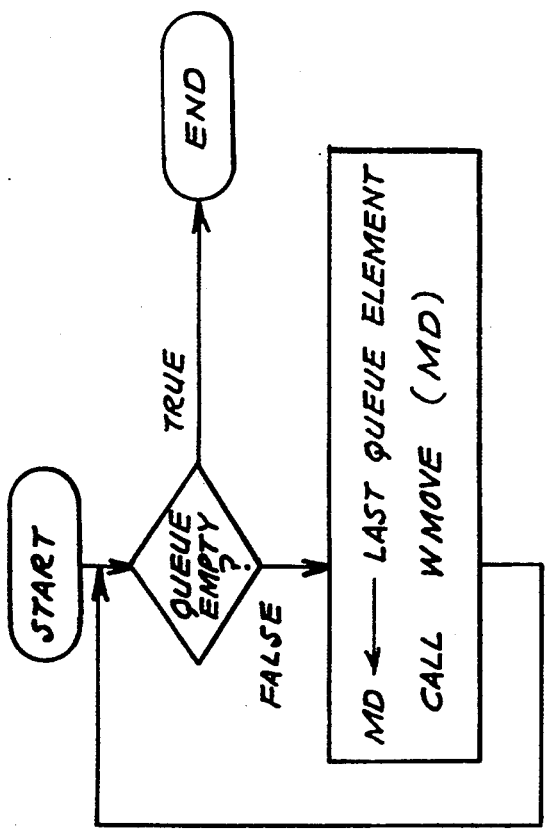
Figure 25:
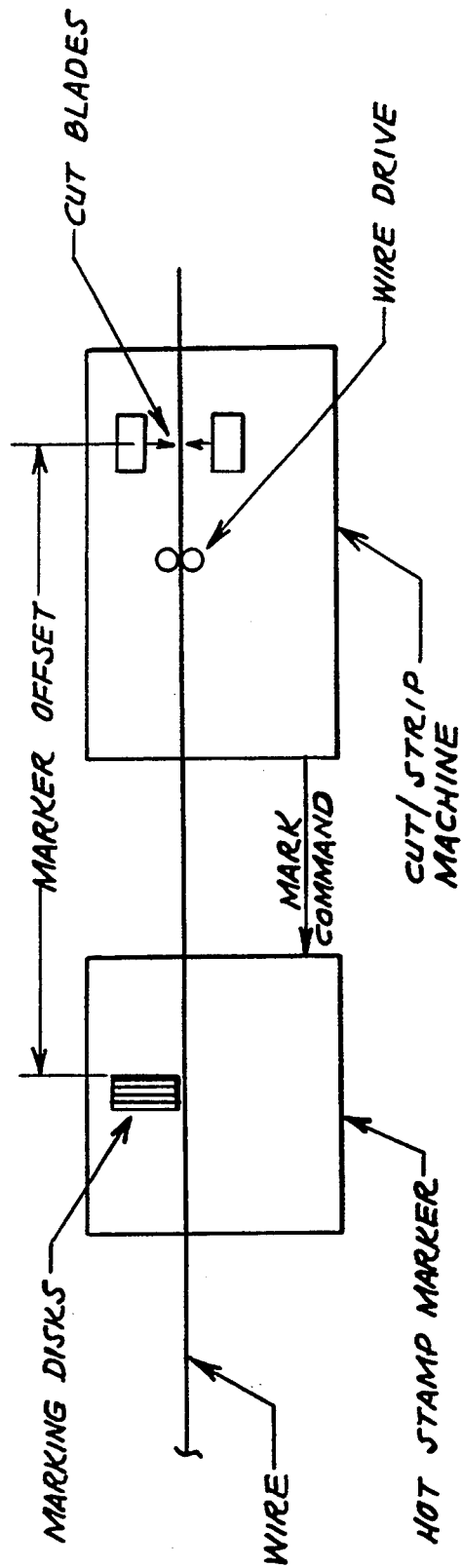
FIG. 25 is a diagram of a wire marker and wire cut and strip apparatus, as related to FIGS. 20–24.

FIGS. 20-25 describe and show an algorithm usable in the wire cutting and stripping machine for the purpose of controlling a hot stamp wire marking machine. Using this algorithm, marks can be placed on a wire by the marking machine located in the upstream direction relative to the direction of wire motion. The wire cutting and stripping machine then cuts the wire at the appropriate points relative to the previously placed marks. See FIG. 25 showing a typical set up.

The algorithm involves time and distance displacement of the cut action relative to the mark action. It is not necessary to purge (batch out) the machine of all marked wires after the last mark is placed on the last wire of a batch before starting a new batch of marked wires. This is the principle of the "save wire" feature, which prevents the waste of the length of the wire stretching from the mark point to the cut point between batches.

The wire marking algorithm will be best understood by first describing the main data structure used, and then describing a series of hierarchical routines starting from the top level production routine and working downwards to lower level routines.

Data Structure

Figure 20:
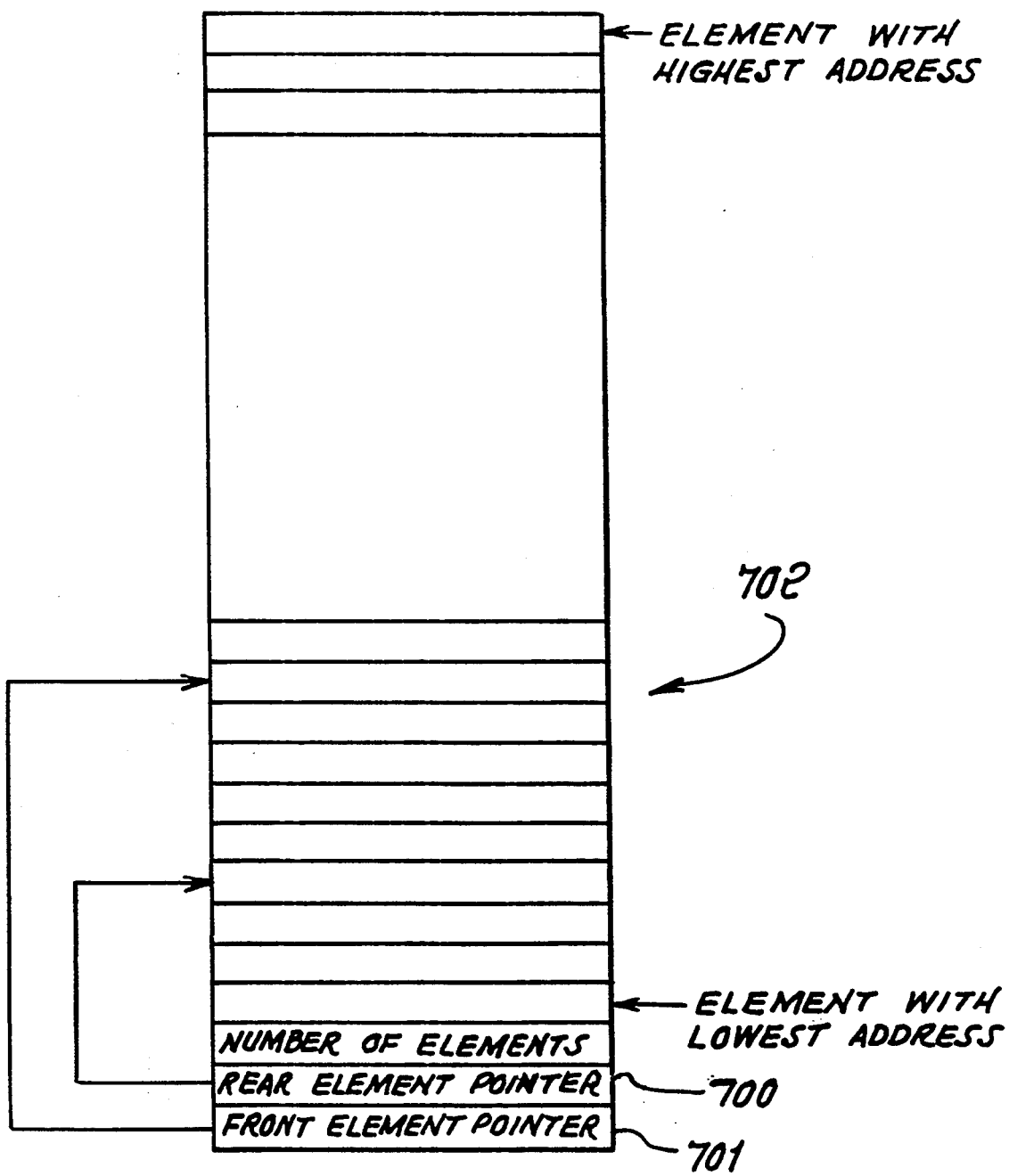
FIGS. 20–24 are data control flow diagrams.

FIG. 20 shows a diagram of the circular queue data structure which is used by the algorithm to keep track of future wire cut points. The structure contains fifty (50) cut point data storage locations, a rear element pointer 700, a front element pointer 701, and a storage location 702, for the current number of elements. Elements are added to the queue by placing them in the memory location pointed to by the front element pointer, incrementing the pointer and incrementing the number of elements. Elements are removed by incrementing the rear element pointer and decrementing the number of elements. If a pointer points to the highest memory location allocated to the queue, it is "incremented" by making it point to the lowest address allocated to the queue.

The Production Routine

Figure 21:
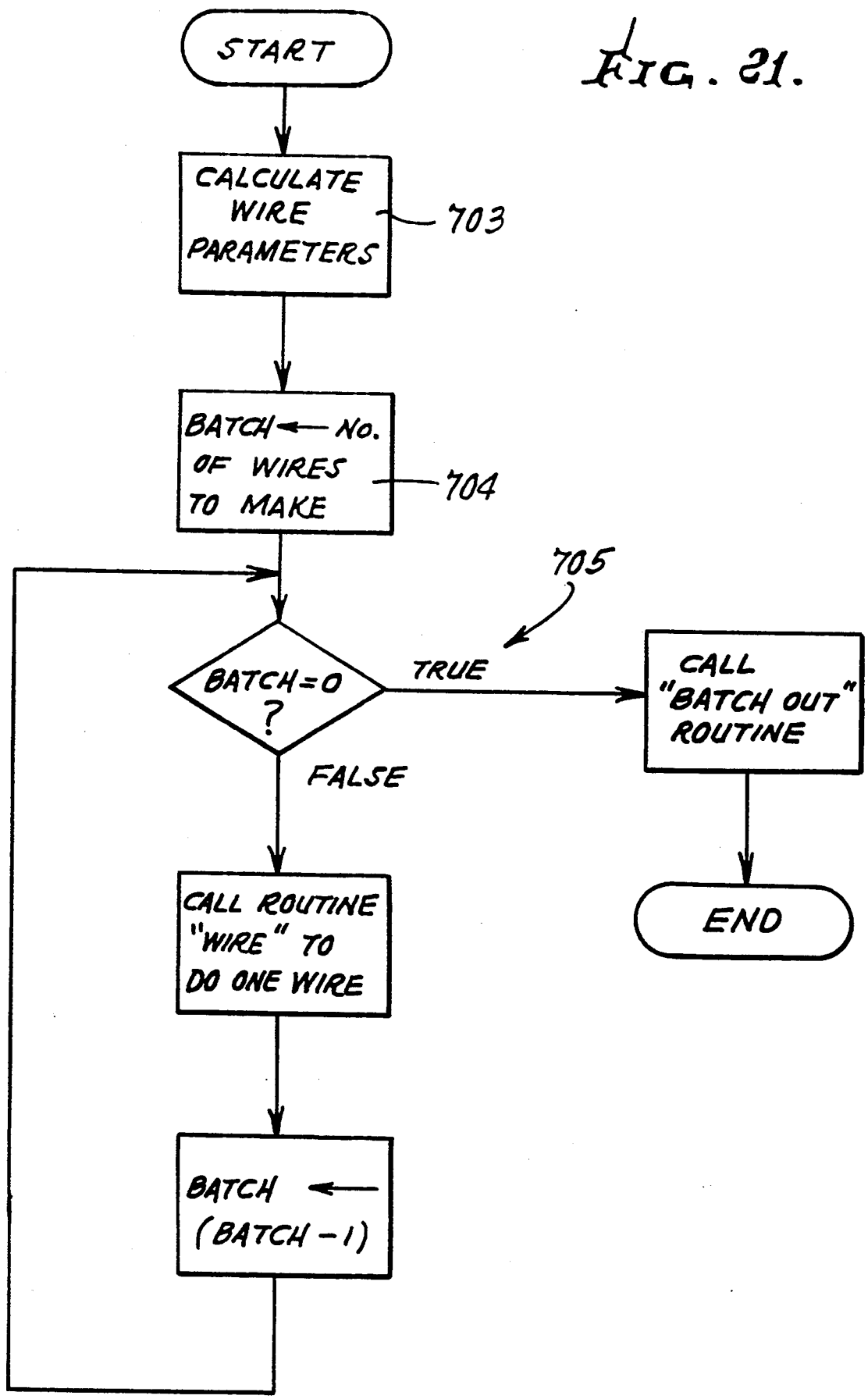

The flow chart shown in FIG. 21 is the main loop controlling the production of a batch of wires. The routine calculates at 703 various parameters based upon user input, initializes a batch counter 704, then repeatedly calls at 705 a wire production routine until the requisite number of wires has been produced.

The parameters calculated from user input are Marker Offset ($L_M$), Wire Length ($L_W$), Number of Marks Per Wire (N), Mark Distance (D), and Remainder Distance (R). Mark Distance is the spacing between marks for continuous marking. The Remainder Distance is the distance left over after dividing the wire length by the mark distance.

The Wire Production Routine (WIRE)

Figure 22:
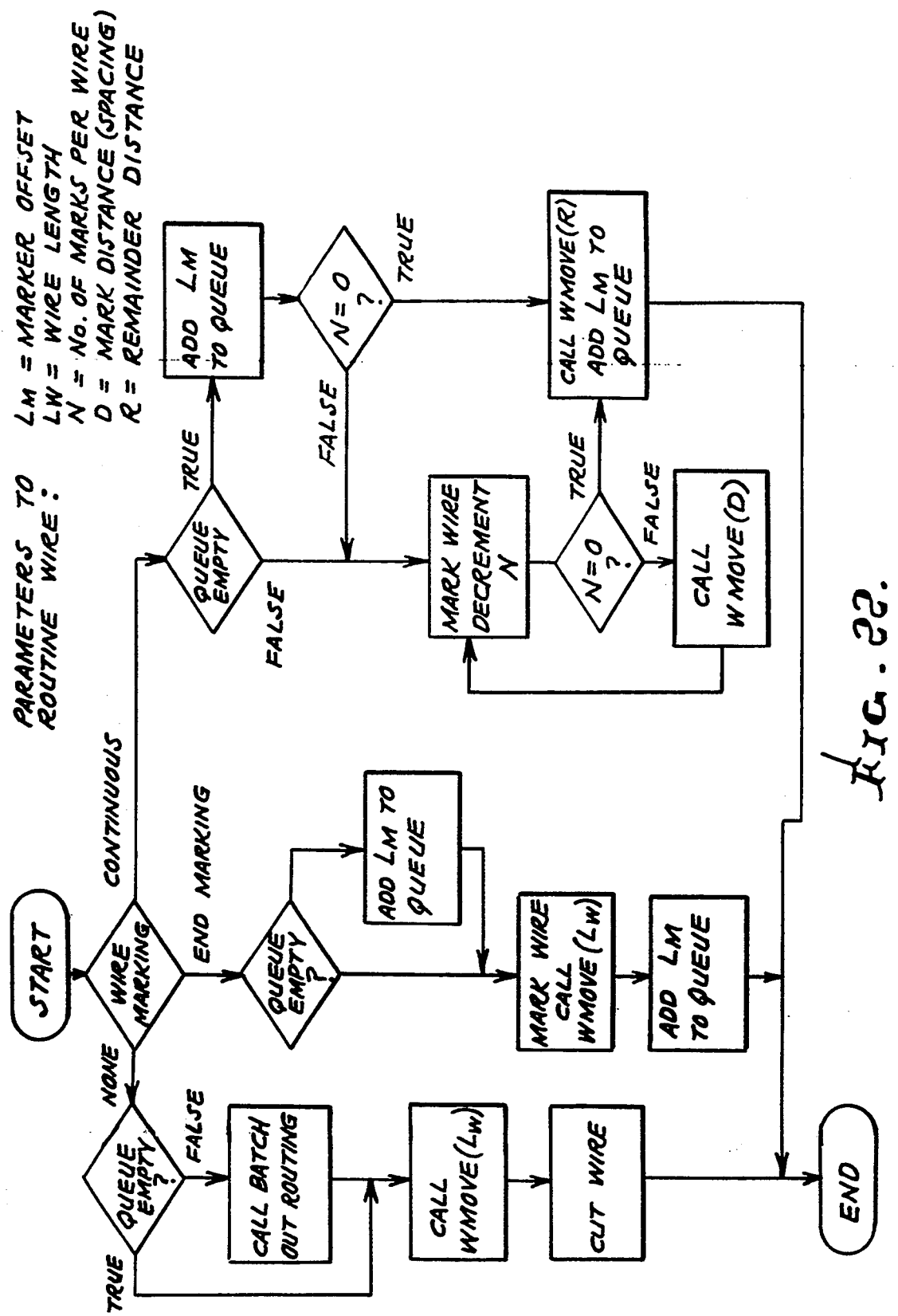

This routine, shown in FIG. 22, produces one wire based on the parameters calculated in the Production Routine. The main branch is a three-way selection depending upon whether continuous marking, end marking or no marking has been selected. The routine marks adds future cut points to the queue, and calls a wire moving routine at the appropriate points in the program. The distance to move is passed to the wire moving routine.

The Batch Out Routine

The purpose of this routine, seen in FIG. 24, is to purge the machine of all marked but uncut wires. This is done when a transition from marked wires to unmarked wires occurs or if the machine operator has selected the batch out option.

The Wire Moving Routine (WMOVE)

This routine, seen in FIG. 23, is passed a value ($M_D$), which is the total distance to move the wire. The routine checks to see if an intermediate cut point is stored in the queue. If so, the distance to the cut point is moved, the wire stopped and the cut performed. All queue elements are adjusted appropriately each time the wire is moved. The move, cut sequence is repeated until the wire has been moved the full distance called for by the parameter $M_D$.

We claim:

1. In a system for marking elongated wire and for cutting the wire and stripping insulation therefrom, the combination comprising a) first means operable to mark the wire, b) second means operable to cut the marked wire and to strip insulation from the wire, c) the wire extending between and movable between said first and second means, said first and second means comprising separate stand-alone devices, d) and control means operatively connected with said first and second means for controlling operation of said first and second means in time sequence relation to wire movement therebetween, and characterized in that changes in timing of markings by operation of said first means can occur while said second means operates to complete cutting and severing of wire associated with prior markings, thereby to reduce or eliminate wire waste.

2. The combination of claim 1 wherein said control means includes a computer located at a station relative to which said first and second means are movable, said control means including means for storing a signal or signals causing said first and second means to mark and cut the wire substantially simultaneously.

3. The combination of claim 1 wherein said control means is located externally of said first and second means.

4. The combination of claim 1 wherein said control means comprises a programmed computer.

5. The combination of claim 4 wherein said control means includes circuitry to transmit command signals and status signals between said first and second means.

6. The combination of claim 1 wherein said first means includes a microprocessor to control marking of the wire, said control means connected with said microprocessor.

7. The combination of claim 1 wherein said control means includes circuitry to transmit command signals and status signals between said first and second means.

8. The combination of claim 3 wherein said control means includes circuitry to transmit command signals and status signals
between said control means and said first means
between said control means and said second means.

9. The combination of claim 1 wherein said wire has markings thereon and spaced at intervals along the wire length between said first means and second means, said markings produced by said first means.

10. The combination of claim 9 wherein said wire includes sections cut by said second means, and at locations between said markings.

11. The combination of claim 1 wherein said first means is positioned at a location from which said wire is driven toward said second means.

12. The combination of claim 9 wherein said first means is positioned at a location from which said wire is driven toward said second means.

13. The combination of claim 1 including drive means at said second means for interruptedly driving the wire.

14. The combination of claim 9 wherein said control means includes circuitry to store command information to produce successive spaced markings on the wire at times $t_1$ and $t_2$ by said first means, and to store command information to produce delayed cutting of the wire by said second means and between said spaced markings, at time $t_3$, where $t_3$ is after $t_1$ and $t_2$.

15. The combination of claim 13 wherein said control means includes circuitry to store command information to produce successive spaced markings on the wire at times $t_1$ and $t_2$ by said first means, and to store command information to produce delayed cutting of the wire by said second means and between said spaced markings, at time $t_3$, where $t_3$ is after $t_1$ and $t_2$, and said control means includes circuitry to control driving of the wire at a rate to bring said space between said markings into position for wire cutting at $t_3$.

16. The combination of claim 13 wherein said control means stores a signal or signals causing said first and second means to mark and cut the wire simultaneously.

17. The combination of claim 1 wherein said first means includes a wire marker and an actuator to cause said marker to mark the wire, and said second means includes a wire cutter and an actuator to displace the cutter to cut the wire.

18. The combination of claim 17 wherein said control means is operatively connected with said actuators.

19. In a system for marking elongated wire and for cutting the wire and stripping insulation therefrom, the combination comprising
a) first means operable to mark the wire,
b) second means operable to cut the marked wire and to strip insulation from the wire,
c) the wire extending between and movable between said first and second means, said first and second means comprising separate devices,
d) and control means operatively connected with said first and second means for controlling operation of said first and second means in time sequence relation to wire movement therebetween,
e) said control means including programmable means to control operation of said second means to in turn control insulation strip length,
f) said control means including circuitry operable to prevent wastage of marked wire.

20. In a system for marking elongated wire and for cutting the wire and stripping insulation therefrom, the combination comprising
a) first means operable to mark the wire,
b) second means operable to cut the marked wire and to strip insulation from the wire,
c) the wire extending between and movable between said first and second means, said first and second means comprising separate devices,
d) and control means operatively connected with said first and second means for controlling operation of said first and second means in time sequence relation to wire movement therebetween,
e) said control means including programmable means to control said first means for marking the wire,
f) said control means including circuitry operable to prevent wastage of marked wire.

21. In a system for marking elongated wire and for cutting the wire and stripping insulation therefrom, the combination comprising
a) first means operable to mark the wire,
b) second means operable to cut the marked wire and to strip insulation from the wire,
c) the wire extending between and movable between said first and second means, said first and second means comprising separate devices,
d) and control means operatively connected with said first and second means for controlling operation of said first and second means in time sequence relation to wire movement therebetween,
e) said control means including programmable means to control said second means for cutting the wire,
f) said control means including circuitry operable to prevent wastage of marked wire.

22. In a system for marking elongated wire and for cutting the wire and stripping insulation therefrom, the combination comprising
a) first means operable to mark the wire,
b) second means operable to cut the marked wire and to strip insulation from the wire,
c) the wire extending between and movable between said first and second means, said first and second means comprising separate devices,
d) and control means operatively connected with said first and second means for controlling operation of said first and second means in time sequence relation to wire movement therebetween,
e) said control means including programmable means including memory means to store data associated with at least two programs for controlling said first and second means,
f) said control means including circuitry operable to prevent wastage of marked wire.

23. The combination of claim 22 including means controlled by said control means for attaching terminals to wire cut ends produced by operation of said second means.

24. In a system for marking elongated wire and for cutting the wire and stripping insulation therefrom, the combination comprising
   a) first means operable to mark the wire,
   b) second means operable to cut the marked wire and to strip insulation from the wire,
   c) the wire extending between and movable between said first and second means, said first and second means comprising separate devices,
   d) and control means operatively connected with said first and second means for controlling operation of said first and second means in time sequence relation to wire movement therebetween,
   e) said control means including programmable means including memory means to store data associated with at least two programs for controlling said first and second means, and
   f) said control means including circuitry for controlling the time sequence of the operation of said first and second means so that no wire is wasted when changing from one program to another.

25. In a system for marking elongated wire and for cutting the wire and stripping insulation therefrom, the combination comprising
   a) first means operable to mark the wire,
   b) second means operable to cut the marked wire and to strip insulation from the wire,
   c) the wire extending between and movable between said first and second means, said first and second means comprising separate devices,
   d) and control means operatively connected with said first and second means for controlling operation of said first and second means for controlling operation of said first and second means in time sequence relation to wire movement therebetween,
   e) said control means including means to store data associated with at least two programs for controlling said first and second means, to control operation of said second means to in turn control insulation strip length, and to control operation of said first means to in turn control the distance between the marks on the wire and to produce at least two different programmed distances between marks on a single wire,
   f) said first means including a microprocessor to control marking of the wire, and said control means associated with the microprocessor.

26. In a system for marking elongated wire and for cutting the wire and stripping insulation therefrom, the combination comprising
   a) first means operable to mark the wire,
   b) second means operable to cut the marked wire and to strip insulation from the wire,
   c) the wire extending between and movable between said first and second means, said first and second means comprising separate devices,
   d) and control means operatively connected with said first and second means for controlling operation of said first and second means in time sequence relation to wire movement therebetween,
   e) said control means including means to store data associated with at least two programs for controlling said first and second means, and to control operation of said first means to in turn control the distance between the marks on the wire,
   f) and said control means including means for controlling the time sequence of the operation of said first and second means so that no wire is wasted when changing from one program to another.

27. In a system for marking elongated wire and for cutting the wire and stripping insulation therefrom, the combination comprising
   a) first means including a microprocessor operable to mark the wire,
   b) second means operable to cut the marked wire and to strip insulation from the wire,
   c) the wire extending between and movable between said first and second means, said first and second means comprising separate devices,
   d) and control means operatively connected with said first and second means for controlling operation of said first and second means in time sequence relation to wire movement therebetween,
   e) said control mans including means to store data associated with at least two programs for controlling said first and second means, and to control operation of said first means to in turn control the selection of characters to be marked on the wire.

28. In a system for marking elongated wire and for cutting the wire and stripping insulation therefrom, the combination comprising
   a) first means including a microprocessor operable to mark the wire,
   b) second means operable to cut the marked wire and to strip insulation from the wire,
   c) the wire extending between and movable between said first and second means, said first and second means comprising separate devices,
   d) and control means operatively connected with said first and second means for controlling operation of said first and second means in time sequence relation to wire movement therebetween,
   e) said control means including means to store data associated with at least two programs for controlling said first and second means, to control operation of said first means to in turn control the distance between the marks on the wire, and to control operation of said first means to in turn control the selection of characters to be marked on the wire.

29. In a system for marking elongated wire and for cutting the wire and stripping insulation therefrom, the combination comprising
   a) first means including a microprocessor operable to mark the wire,
   b) second means operable to cut the marked wire and to strip insulation from the wire,
   c) the wire extending between and movable between said first and second means, said first and second means comprising separate devices,
   d) and control means operatively connected with said first and second means for controlling operation of said first and second means in time sequence relation to wire movement therebetween,
   e) said control means including means to store data associated with at least two programs for controlling said first and second means, to control operation of said first means to in turn control the distance between the marks on the wire and to produce at least two different programmed distances between marks on a single wire, and to control operation of said first means to in turn control the selection of characters to be marked on the wire.

30. In a system for marking elongated wire and for cutting the wire and stripping insulation therefrom, the combination comprising
  a) first means operable to mark the wire,
  b) second means operable to cut the marked wire and to strip insulation from the wire,
  c) the wire extending between and movable between said first and second means, said first and second means comprising separate devices,
  d) and control means operatively connected with said first and second means for controlling operation of said first and second means in time sequence relation to wire movement therebetween,
  e) said control means including means to control operation of said second means to in turn control insulation strip length, and to control operation of said first means to in turn control the selection of characters to be marked on the wire.

31. In a system for marking elongated wire and for cutting the wire and stripping insulation therefrom, the combination comprising
  a) first means operable to mark the wire,
  b) second means operable to cut the marked wire and to strip insulation from the wire,
  c) the wire extending between and movable between said first and second means, said first and second means comprising separate devices,
  d) and control means operatively connected with said first and second means for controlling operation of said first and second means in time sequence relation to wire movement therebetween,
  e) said control means including means to control operation of said first means to in turn control the selection of characters to be marked on the wire.

32. The combination of claim 28 wherein said control means including computer means operable to prevent wastage of marked wire.

33. The combination of claim 32 including means controlled by said control means for attaching terminals to wire cut ends produced by operation of said second means.

34. The combination of claim 1 wherein said control means is, at least in part, located at said first means.

35. The combination of claim 1 wherein said control means is, at least in part, located at said second means.

* * * * *